(12) United States Patent
Kato et al.

(10) Patent No.: US 7,690,023 B2
(45) Date of Patent: Mar. 30, 2010

(54) SOFTWARE SAFETY EXECUTION SYSTEM

(75) Inventors: Kazuhiko Kato, Ibaraki (JP); Yoshihiro Oyama, Ibaraki (JP)

(73) Assignee: Japan Science and Technology Agency, Saitama (JP)

( * ) Notice: Subject to any disclaimer, the term of this patent is extended or adjusted under 35 U.S.C. 154(b) by 1127 days.

(21) Appl. No.: 10/498,318

(22) PCT Filed: Dec. 3, 2002

(86) PCT No.: PCT/JP02/12659

§ 371 (c)(1),
(2), (4) Date: Apr. 15, 2005

(87) PCT Pub. No.: WO03/050662

PCT Pub. Date: Jun. 19, 2003

(65) Prior Publication Data

US 2005/0228990 A1    Oct. 13, 2005

(30) Foreign Application Priority Data

Dec. 13, 2001 (JP) .............................. 2001-380629

(51) Int. Cl.
*H04L 29/06* (2006.01)
(52) U.S. Cl. ........................................................ 726/1
(58) Field of Classification Search ........................ None
See application file for complete search history.

(56) References Cited

U.S. PATENT DOCUMENTS 6,167,522 A    12/2000  Lee et al.
2002/0092003 A1*  7/2002  Calder et al. ................. 717/138

FOREIGN PATENT DOCUMENTS

JP    2001-175526 A    6/2001
WO    WO 98/44404       10/1998

OTHER PUBLICATIONS

English Translation of the International Preliminary Examination Report, Oct. 14, 2004.

* cited by examiner

*Primary Examiner*—Brandon S Hoffman
(74) *Attorney, Agent, or Firm*—Rader, Fishman & Grauer, PLLC

(57) ABSTRACT

A secure software execution mechanism appropriate for software circulation is provided. At a sender site 312, an executable file 332 and a data file 334 processed by the executable file are encapsulated. The remaining two files 336 and 338 do not physically exist in a pot 320 at the sender site, and an archive file 320 is transferred to a receiver site 314. At the receiver site 314, intangible files 336 and 338 within a pot may be mapped to a file 354 in a local file system or a file 356 within another pot 350 and processed using a file 334 in a pot or the mapped file 354 or 356 by executing a program 332, in conformity with the specification of a security policy 340.

15 Claims, 32 Drawing Sheets

FIG.1
(a) ENCAPSULATION
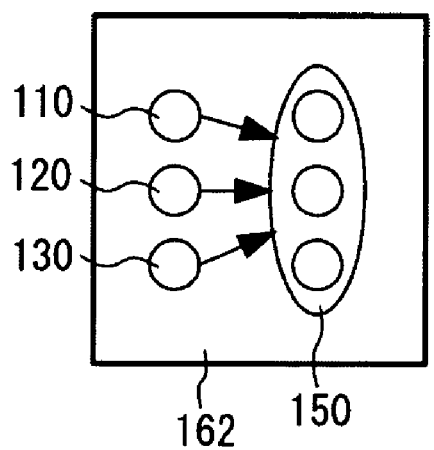
(b) TRANSFER
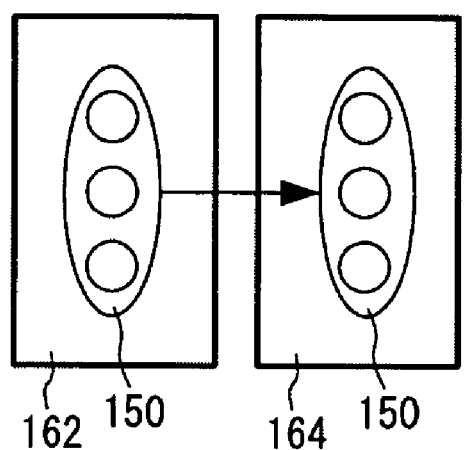
(c) EXTRACTION
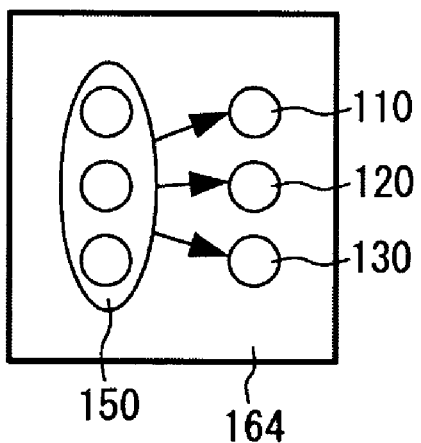
(d) EXECUTION
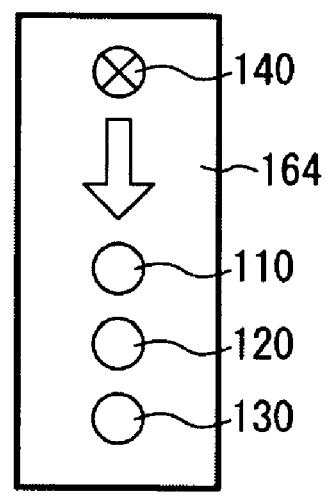

FIG.6
(a) ENCAPSULATION
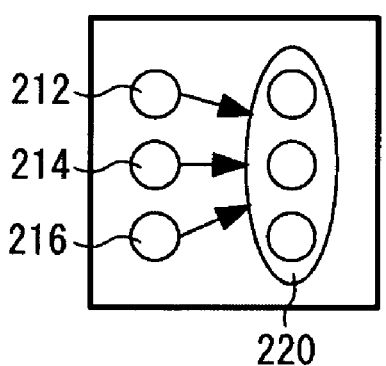
(b) TRANSFER
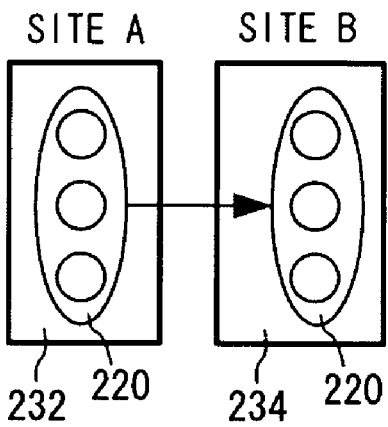
(c) MAPPING
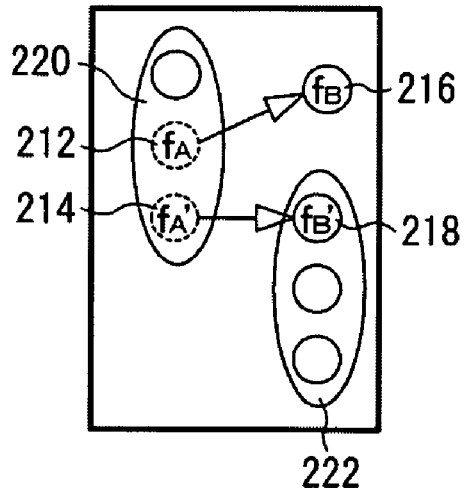
(d) EXECUTION
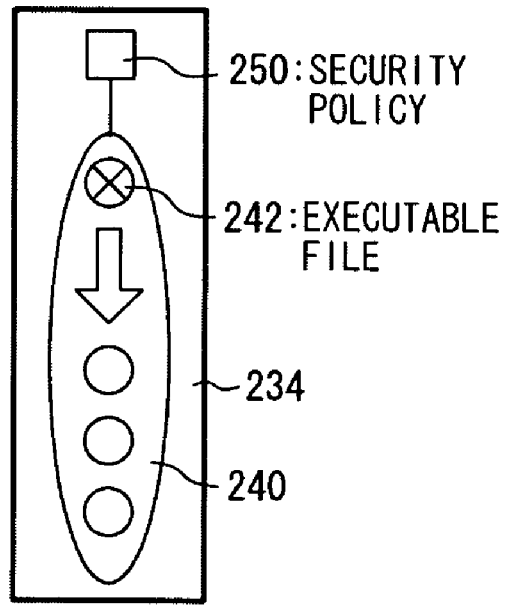

FIG.8
(a) DIRECTORY MAPPING
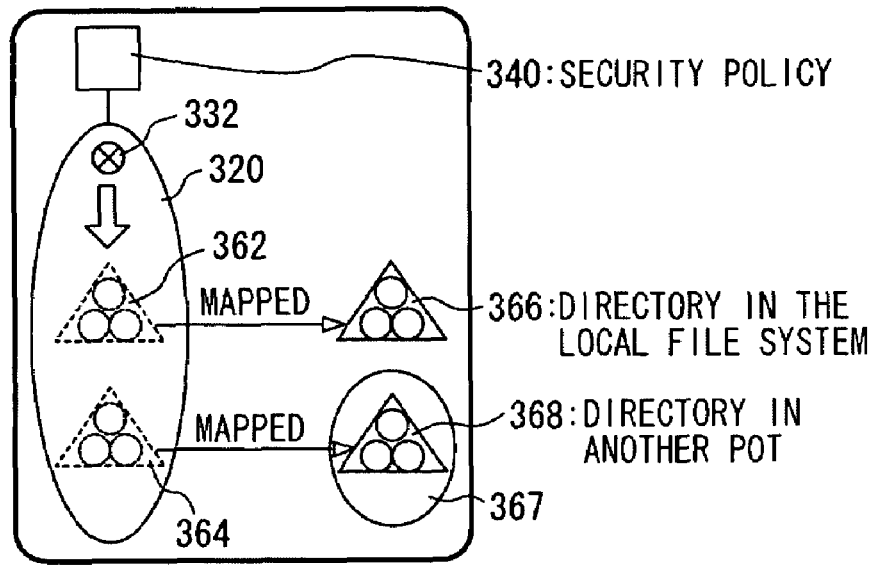
(b) CASCADE MAPPING
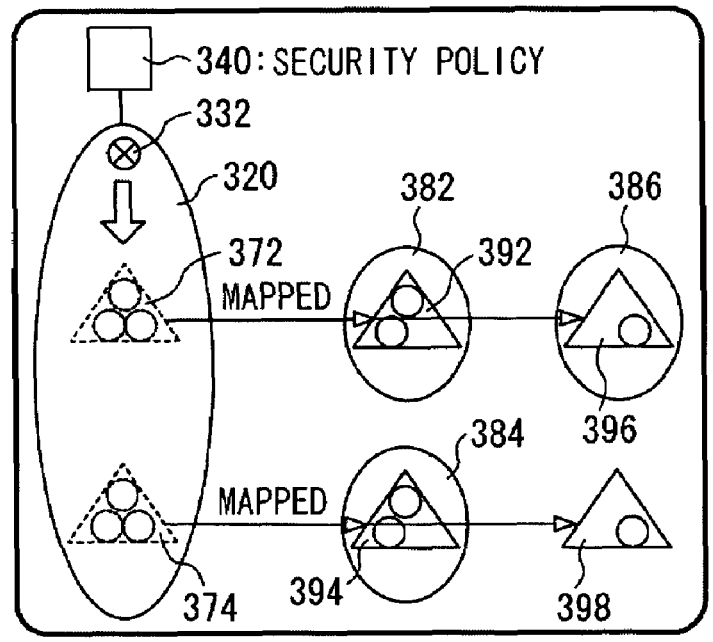

FIG.10
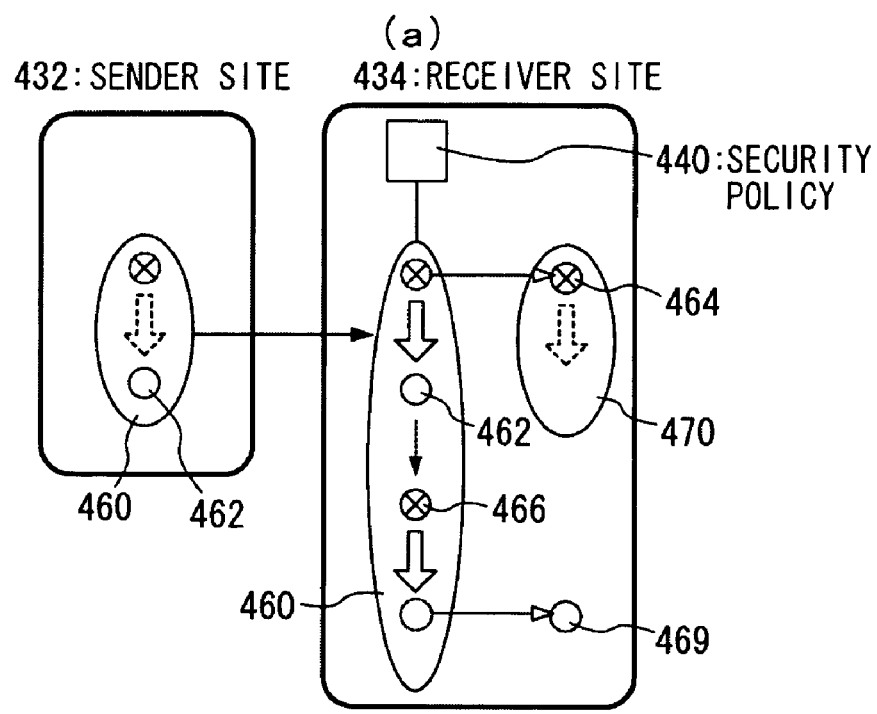
(a)
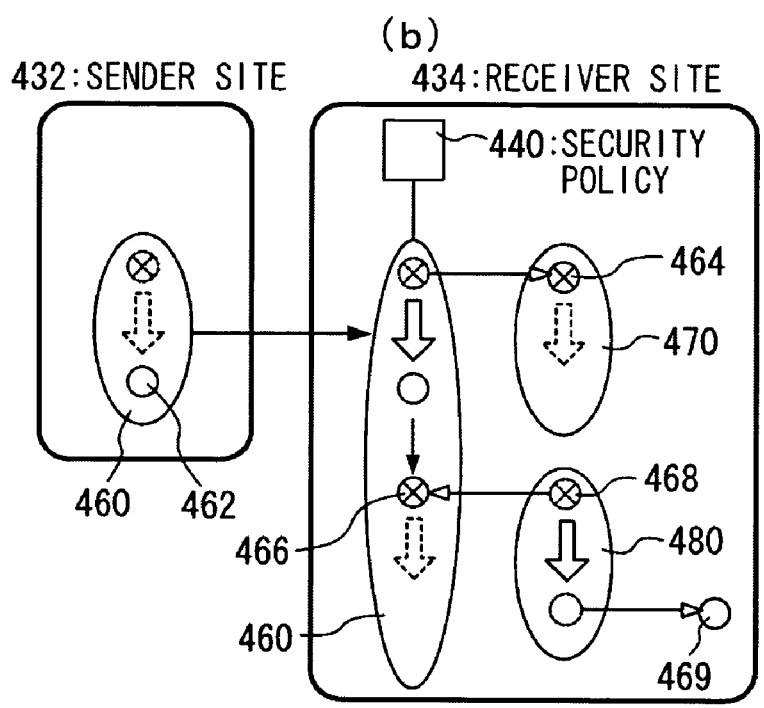
(b)

FIG.12
(a)
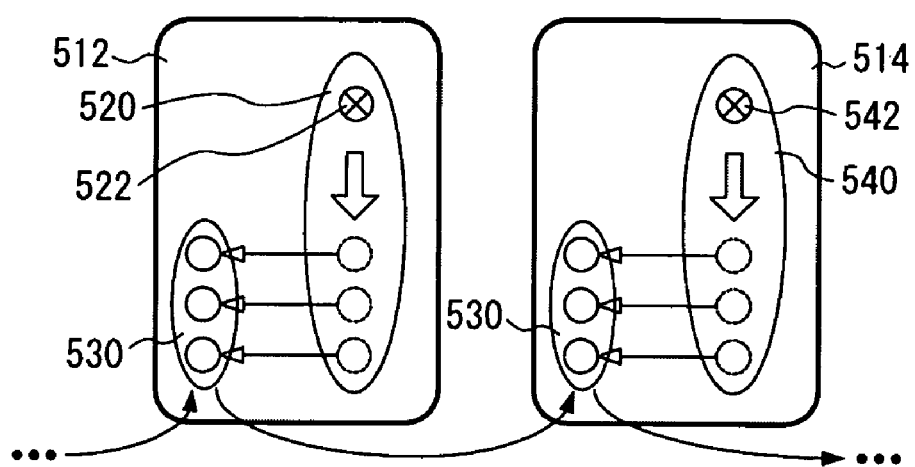
(b)
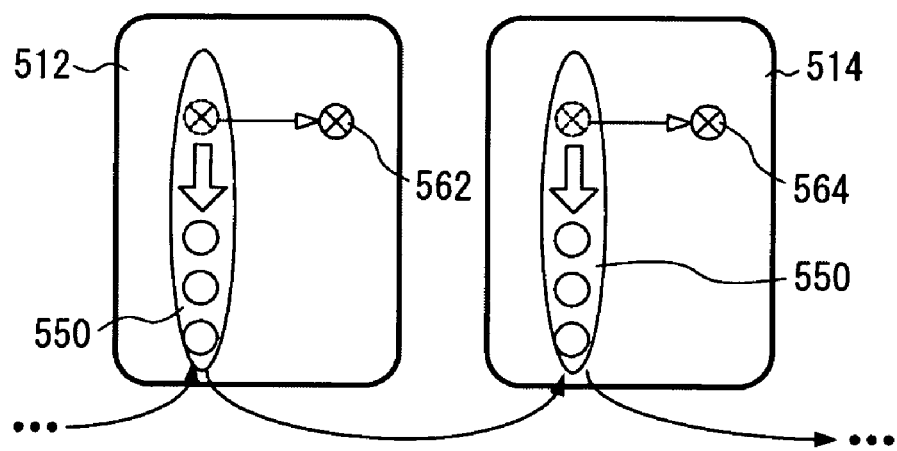

FIG.13

```
600
┌─────────────────────────────────────────────────────────────────────┐
│ static:──612                                                        │
│   /data/pic1.jpg    /home/user1/picture/picA.jpg──613               │
│   /data/pic2.jpg    /home/user1/picture/picB.jpg──614               │
│   /mybin/viewer     /usr/local/bin/viewer──615                      │
│   /mybin/runner     /home/user1o/bin/runner──616                    │
│ dynamic:──622                                                       │
│   /mybin/viewer_plugin1  http://www.foo.com/viewer_plugin1──624     │
│   /mybin/viewer_plugin2  /home/user1/bin/viewer_plugin2──626        │
│ required:──632                                                      │
│   /var──634                                                         │
│   /extern_world──636                                                │
│ saved:──642                                                         │
│   /log──644                                                         │
│ entry:──652                                                         │
│   /mybin/runner──654                                                │
└─────────────────────────────────────────────────────────────────────┘
 610⎰       620⎰        630⎰     640⎰   650⎰
```

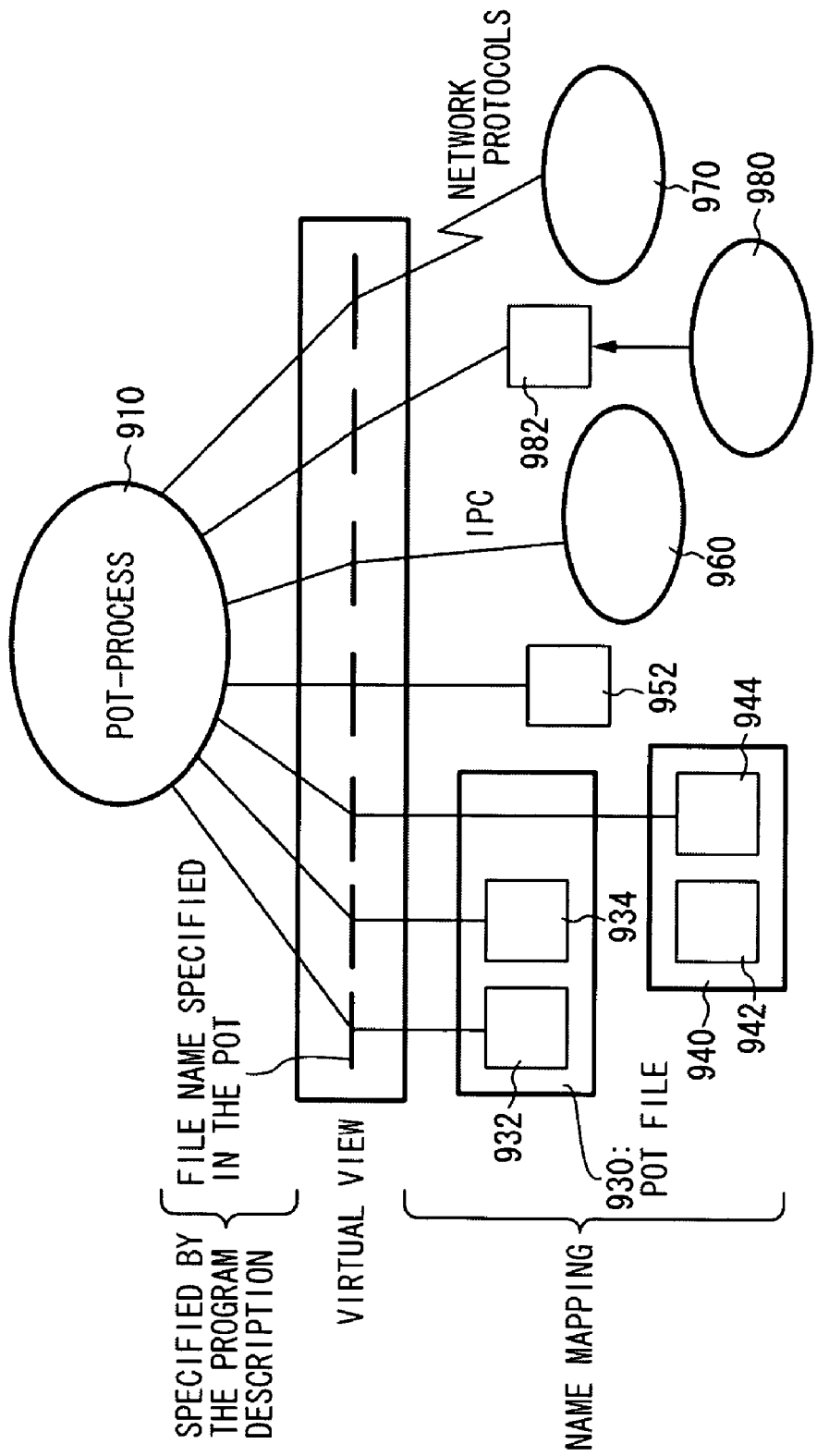

FIG.17

```
1000
map:
    /var         /tmp/var
    /extern_world /home/user2/tmp
    /etc/termcap  /lib/tools.pot:/etc/termcap
    /alpha        /beta,/gamma,/delta
temporary:
    /etc/account  "/sbin/account_processing /users all"
indirect:
    /etc/passwd   /home/user2/bin/passwd_filter
network:
    deny all
    allow connect tcp 130.158.80.*        80 # HTTP
    allow connect tcp 130.158.85.97       21 # FTP
    allow bind    tcp *.tsukuba.ac.jp 22 # ssh
syscall:
    allow all
    deny fork, fork1, vfork,
    deny unlink, rmdir, rename
```

1010 { map section
1020 { temporary
1030 { indirect
1040 { network
1050 { syscall

FIG.22

(a) FILE REGISTRATION WINDOW 1 — 1630

TRANSMISSION OF POT FILE INFORMATION

1. TRANSMISSION OF POT FILE INFOMATION
2. COMPLETION OF REGISTRATION

TRANSMISSION CONTENTS — 1632
POT FILE NAME : foo.pot
POT FILE SIZE : 100 KBytes
POT FILE CREATED DATE : 2001/11/20
POT FILE UPDATED DATE : 2001/11/22
POT FILE OWNER : kato TRANSMISSION DESTINATION — 1634
(AUTHENTICATION SITE)
JAPAN SCIENCE AND TECHNOLOGY CORPORATION AUTHENTICATION SITE
http://www.jst.go.jp/SoftwarePot/

SEND — 1636    CANCEL — 1638

(b) FILE REGISTRATION WINDOW 2 — 1640

CONFIRMATION

1. TRANSMISSION OF POT FILE INFOMATION
2. COMPLETION OF REGISTRATION

REGISTRATION HAS BEEN COMPLETED. — 1642

REGISTRATION DESTINATION — 1644
(AUTHENTICATION SITE)
JAPAN SCIENCE AND TECHNOLOGY CORPORATION AUTHENTICATION SITE
http://www.jst.go.jp/SoftwarePot/

CONFIRM — 1646

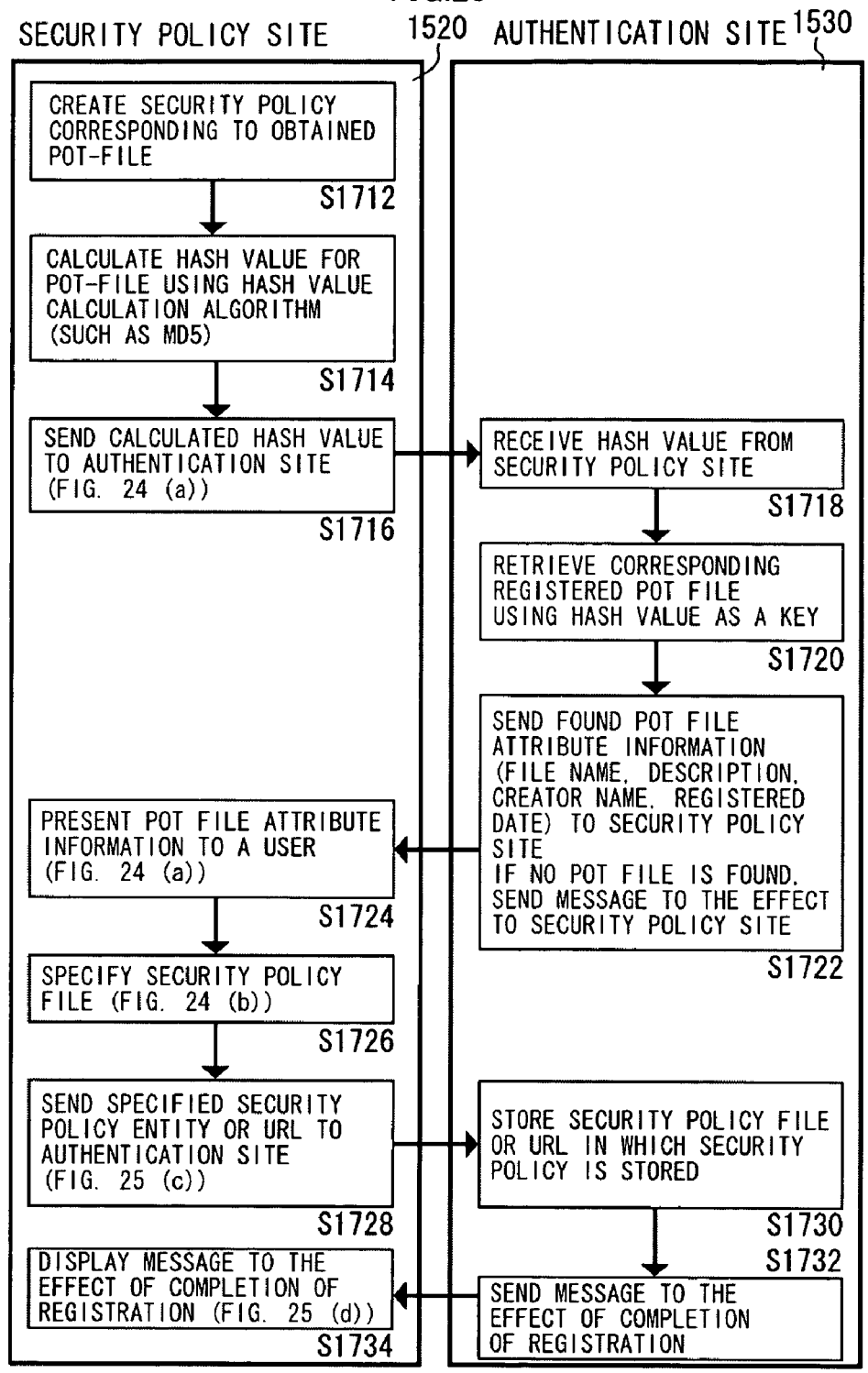

FIG.30

```
        static:    ─612
              /data/pic1.jpg ──613
              /data/pic2.jpg ──614
610 ─┤        /data/pic3.jpg ¥ ⎫
              read={kato@orange.com, yosh@banana.com}  ⎬ 618
              write={kato@oragne.com}                  ⎭
              /mybin/viewer  /usr/local/bin/viewer ──615
              /mybin/runner  /home/user1/bin/runner ──616
        dynamic: ──622
              /mybin/viewer_plugin1  http://www.foo.com/viewer_plugin1 ──624
              /mybin/viewer_plugin2  /home/user1/bin/viewer_plugin2 ──626
620 ─┤        /mybin/viewer_plugin3 http://www.foo.com/viewer_plugin3 ¥  ⎫
              read={kato@orange.com, yosh@banana.com}                    ⎬ 628
              write={kato@oragne.com}                                    ⎭
        hybrid: ──662
              /mybin/viewer_pluginA ¥                                                                          ⎫
660 ─┤        dynamic={http://www.foo.com/viewer_pluginA_1,http://www.foo.com/viewer_pluginA_2] ¥              ⎬ 664
              static=http://www.foo.com/viewer_pluginA_1                                                       ⎭
        required: ──632
630 ─┤        /var ──634
              /extern_world ──636
        saved: ──642
640 ─┤        /log ──644
        entry: ──652
650 ─┤        /mybin/runner ──654
```

600

SOFTWARE SAFETY EXECUTION SYSTEM

BACKGROUND OF THE INVENTION

1. Field of the Invention

The present invention relates to a secure software execution mechanism. In particular, it relates to a mechanism appropriate for software circulation.

2. Description of the Related Art

One of the most notable features of the Internet is that it is a truly open environment. Not only is it being constantly extended worldwide, but also no one can fully control or determine who the users are, or what software and contents are distributed through it. These features are in stark contrast to traditional, closed computer environments such as batch, TSS, LAN, or personal systems. Throughout the history of computer systems, the computer environment has almost always been closed, so designers of system software have implicitly assumed a closed environment was the norm. The worldwide spread of the Internet occurred within a relatively short portion of the history of computer system development, so there was little time for designers of system software to fully anticipate the issues that would arise when closed environments became open. Though the environment has drastically opened up, system software whose basic design is based on an assumption of a closed environment is still used. Thus, current computer systems can often be characterized as putting new wine in old bottles.

If a network environment is closed and users cannot access an open network environment such as the Internet, malicious users and the files created by such users are far less likely to exist. Unfortunately, in the Internet environment, this cannot be assumed. Thus, obtaining files, particularly software that includes executable or interpretable code, from the Internet can be a risky activity. One approach now being used to lessen the risk is to use a code-signing technique such as Microsoft's Authenticode. A promising technical approach to solve this problem is to create a 'sandbox' and encapsulate risky effects in a limited, controllable environment separate from the users' ordinary environment. This approach has been adopted in many systems, such as Java, SFI, Janus, MAPbox, and SubDomain.

To clarify the concept of secure software circulation, a model for unsecure software circulation, which is a generalization of software distribution as conventionally performed, is first presented. A model for secure software circulation is then presented and explained how it can be used.

(A Model for Unsecure Software Circulation)

Software circulation is the term used hereafter to refer to a generalization of the 'software distribution' concept. Software distribution usually means unidirectional, one-time, one-to-many distribution of a software package. By relaxing these properties, that is, by making software distribution multidirectional, multi-time, many-to-many, the concept of software circulation is obtained. Software circulation is composed of four basic operations: encapsulation, transfer, extraction, and execution. For each operation, a graphic representation as shown in FIG. 1 is used.

The 'encapsulation operation' shown in FIG. 1(a) is applied to one or more files 110, 120, and 130 and creates an archive file 150 that encapsulate those files. The 'transfer operation' of FIG. 1(b) moves an encapsulated file 150 from a source site 162 to a destination site 164. The 'extraction operation' of FIG. 1(c) is the inverse of the encapsulation operation: one or more files 110, 120, and 130 are extracted from an archive file 150. Extracted files are stored somewhere in the file system of the site 164 where the operation is performed. File allocation, naming, and access-control setting are performed at that time. In the 'execution operation' of FIG. 1(d), an executable program 140 shown as the circle containing a cross is executed. During the execution, files 110, 120, and 130 (the circles without a cross) may be inputted, outputted, or modified.

By combining these operations, typical software circulation scenarios can be represented. FIG. 2 illustrates software distribution. At the sender site 162 (e.g., a distributor of a software package), the files of a software package are encapsulated into an archive file 150. The archive file 150 is transferred from the distributor's site 162 to a receiver (user) site 164. At the user's site 164, the archive file 150 is extracted and stored in the user's file system by file processing or an installation program 140.

FIG. 3 shows a variation of the software distribution of FIG. 2; an extraction and/or installation program 142 are included within the archive file 152. A user who receives that archive file may carry out installation and the like using the program 142 in the archive file 152. This is flexible and convenient, since the distributor can do anything during the installation by describing it in the installation program, even if the user does not have an extraction or installation program.

FIGS. 4 and 5 show iterative styles of software circulation. FIG. 4 models a workflow system. In FIG. 4, programs 144 and 146 at sites 166 and 168 are applied to circulated files 154, 155, and the like, respectively. In FIG. 5, a program 148 included in the circulated file 157 or 158 is executed and this models a mobile agent system.

The presented model in FIGS. 1 through 5 is unsecure in the following aspects:

(1) In the encapsulation operation, a malicious person may lay traps in the archive file; for example, by including files that perform malicious things when executed or that overwrite existing files for malicious purposes when extracted.
(2) During the transfer operation, files may be maliciously interrupted, intercepted, modified, or fabricated.
(3) During the extraction operation, extracted files are stored in the user's file system, their file storage is allocated and named, and their access control is set at that time. These operations are critical for the management of the user's file system, and are quite dangerous if they are not done according to the user's management policy.

From these reasons, this model is called the unsecure software circulation (USC) model.

DISCLOSURE OF THE INVENTION

The objectives of the present invention are to solve the above-mentioned problems, and to provide a secure software execution mechanism appropriate for software circulation.

In order to achieve the above objectives, one aspect of the present invention is a secure software execution system allowing secure software execution, which includes a pot that includes a file name storage unit, which stores the names of files to be used including an executable file, and a file storage unit, which stores files; and a mapping means that translates a file name in the file name storage unit into the file name of an execution system, wherein the mapping means limits accessible files to only those described in the file name storage unit in the pot.

The mapping means extracts a file from the file storage unit and provides it to an execution system before execution or when required during execution.

An executable file name to be initiated first can be stored in the file name storage unit.

In addition, the file name storage unit stores a file name of a file other than those in the file storage unit, and the mapping means maps that file name to a file for an execution system and/or a file in another pot.

Furthermore, the file name storage unit can store directory names, and the mapping means maps each of those directory names to a directory for an execution system and/or a directory in another pot. In this case, the mapping means associates the directory names with a plurality of directories in a predetermined order, and maps them to files in the directories in that order.

The file name storage unit can store file names in a site on a network, and the mapping means transfers a file having the file name from a site to an execution system.

The mapping means can map a process as a file and map to a file created by a process.

The mapping means carries out mapping in conformity with a security policy specification for an execution system. The security policy specification includes specification of system calls that can be issued during execution.

The security policy specification can be downloaded from another site on the network.

Another aspect of the present invention is a server system including pot information and security policy information, which includes: a database that stores pot information and security policy specification corresponding to the pot information; and a retrieving means that can retrieve the security policy by identifying a pot.

Yet another aspect of the present invention is a recording medium that records a program describing implementation of a mapping means in a computer system, which translates a file name in a file name storage unit in a pot into a file name for an execution system, wherein the pot includes a file name storage unit, which stores the names of files to be used including an executable file, and a file storage unit, which stores files; wherein the mapping means limits accessible files to only those described in the file name storage unit in the pot when executing that program.

BRIEF DESCRIPTION OF THE DRAWINGS

FIG. 1, consisting of FIG. 1(a), to 1(d), is a diagram showing four basic operations of software circulation;

FIG. 6, consisting of FIG. 6(a) to 6(d), is a diagram showing four basic operations of software circulation according to an embodiment;

FIG. 8, consisting of FIG. 8(a) to 8(b), is a diagram showing mapping of directories;

FIG. 10, consisting of FIG. 10(a) to 10(b), is a diagram showing execution of a dynamically generated native code;

FIG. 12, consisting of FIG. 12(a) to 12(b), is a diagram showing workflow computing;

FIG. 13 shows an example of specification for encapsulation;

FIG. 16 is a diagram showing an implementation scheme;

FIG. 17 is a diagram showing an exemplary specification for mapping and execution;

FIG. 22 is a diagram showing an exemplary window during file registration process;

FIG. 23 is a flowchart showing a security policy registration process;

FIG. 30 shows an example of encapsulation specification including access control specification;

BEST MODE FOR IMPLEMENTING THE INVENTION

Figure 2:
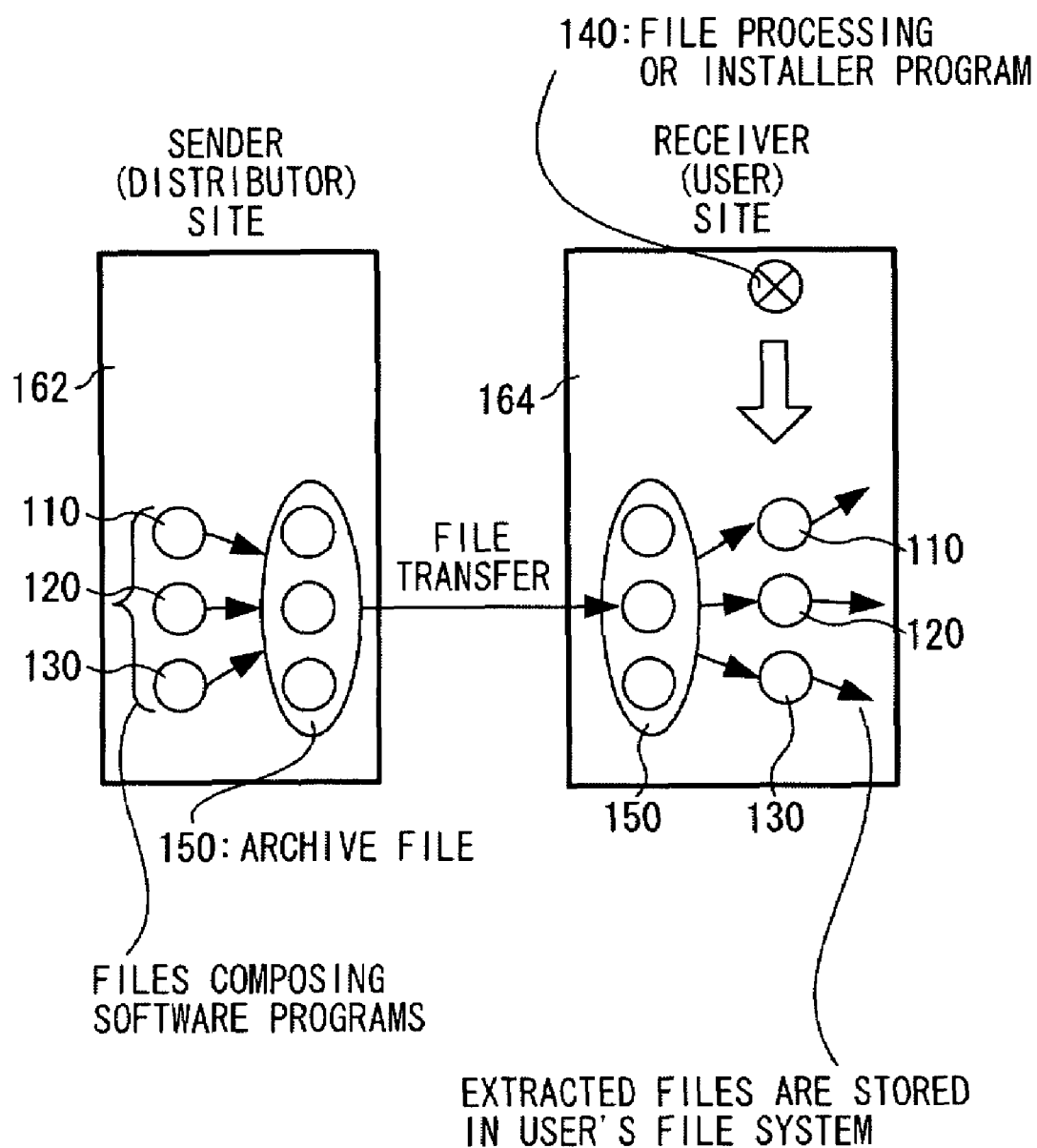
FIG. 2 is a diagram showing software distribution.
Figure 3:
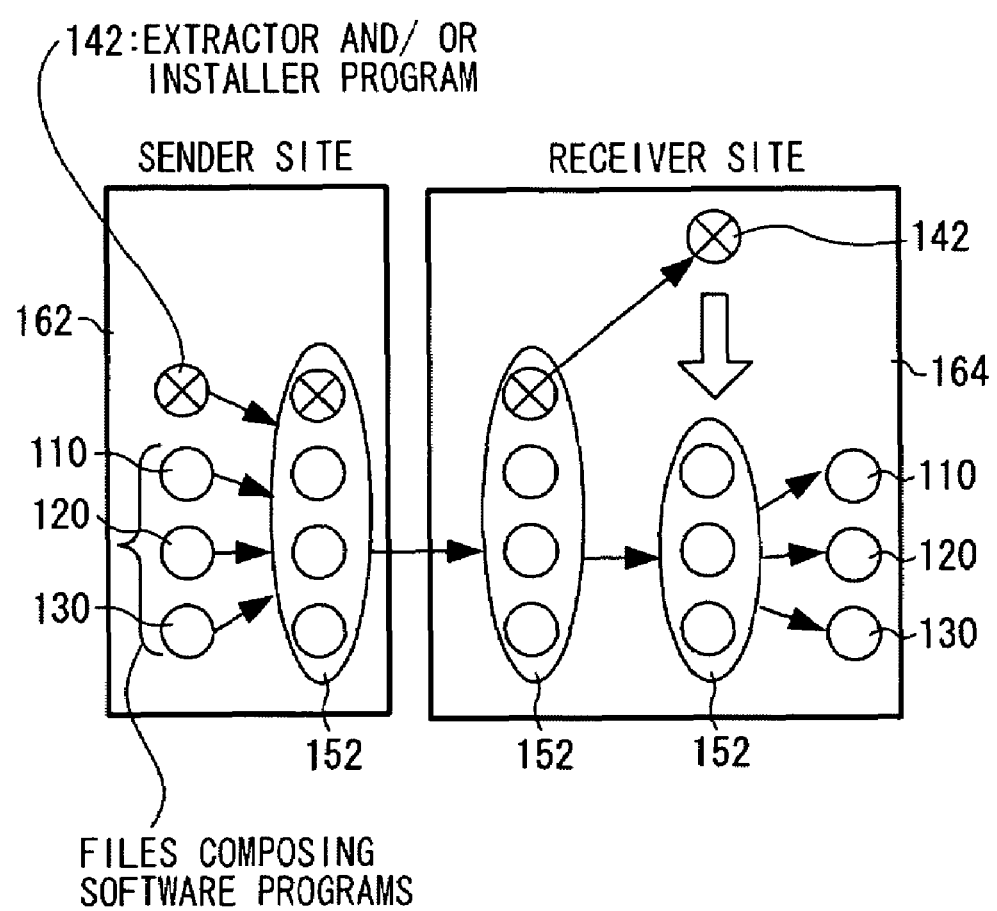
FIG. 3 is a diagram showing transfer of a self-extraction file.
Figure 4:
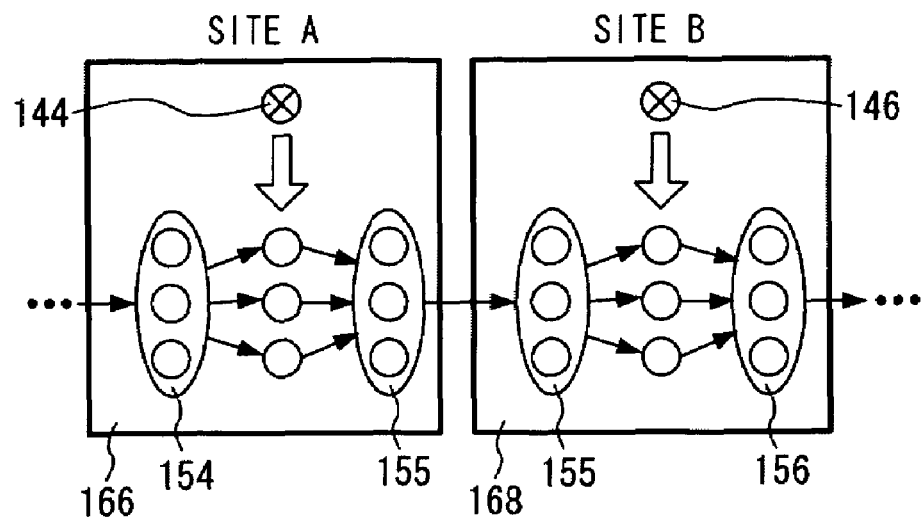
FIG. 4 is a diagram showing a workflow.
Figure 5:
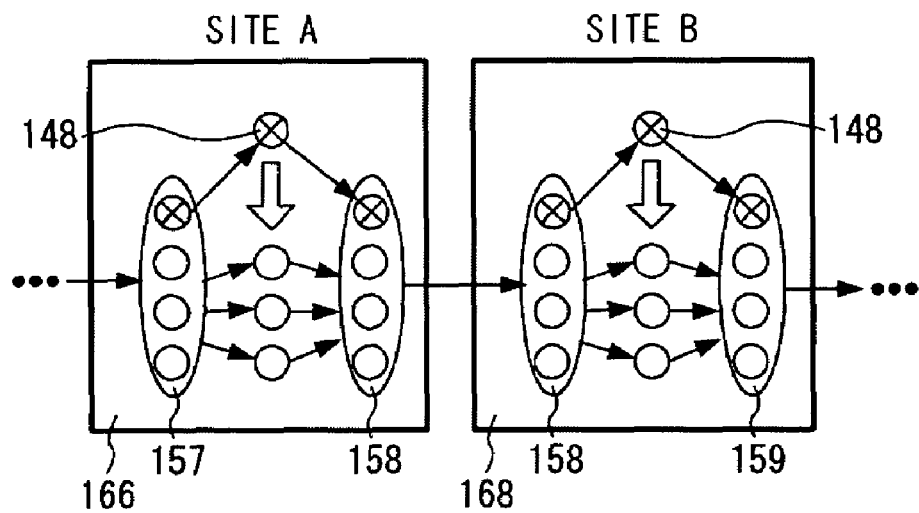
FIG. 5 is a diagram showing mobile agents.

An embodiment of the present invention is described forthwith while referencing the drawings.

Now, a model for secure software circulation (the SSC model) is considered. To start with, the term 'secure' should be explained. First, it is generally accepted that an absolutely 'secure' system is virtually impossible to design. This model and our implemented system based on this model is simply more secure than the USC model regarding security-related issues that are more easily handled in a systematic way. Second, the unsecure aspects of the transfer operation are not limited to software circulation; they are also issues of concern in general information transfer.

The central idea of the SSC model to be described below is that the inner and the outer parts of circulated software during both the execution and the encapsulation are distinguished. To enable this, two concepts have been introduced into the model. First, files are not extracted from archives; instead, the concept of using archive files as a file system is extended. Second, program execution is enabled within a distinct virtual address space associated with the archive space. The SSC model integrates the two spaces—the virtual address space and the file system—into one to create a sandbox called a pot. Each pot has its own, distinct view for both a virtual address space and a virtual file space.

(Basic Operation of the SSC Model)

The basic operation of the SSC model is defined as follows (see FIG. 6 for a graphical representation). Note that a case of applying the present invention to a Unix system is described below.

The encapsulation operation shown in FIG. 6(a) is applied to one or more files 212, 214, and 216 and stores them in a pot 220. During storing, each file is given a unique pathname compatible with the Unix file system, and the attribute-information, such as time of last modification and executability, is recorded. The transfer operation of FIG. 6(b) moves an encapsulated file (pot) 220 from a source site A232 to a destination site B234.

The mapping operation in the SSC model is a substitute for the extraction operation of the USC model. In FIG. 6(c), the mapping operations are represented by arrows with unshaded heads. Mapping file $f_A$ 212 or $f_A'$ 214 in a pot to file $f_B$ 216 in a local file or file $f_B'$ 218 in a pot 222 means that every access to file $f_A$ 212 or $f_A'$ 214 during execution within the pot is redirected to file $f_B$ 216 or $f_B'$ 218.

FIG. 6(d) shows the execution operation. In the execution operation, a program 242 in a pot 240 is not executed in a virtual address space that shares a file system of the execution site 234. A pot 240 is instead associated with a virtual process space just like its own file system, and the program 242 in the pot is executed within that environment; no files other than those appearing in the pot can be seen. It specifies a mapping scheme and the resources allowed to be used.

As described above, a pot of the present invention has two states depending on whether a process is associated with the pot. To distinguish between the two states, the term pot-file is used when a process is not associated with the pot, and pot-process when it is associated.

Figure 7:
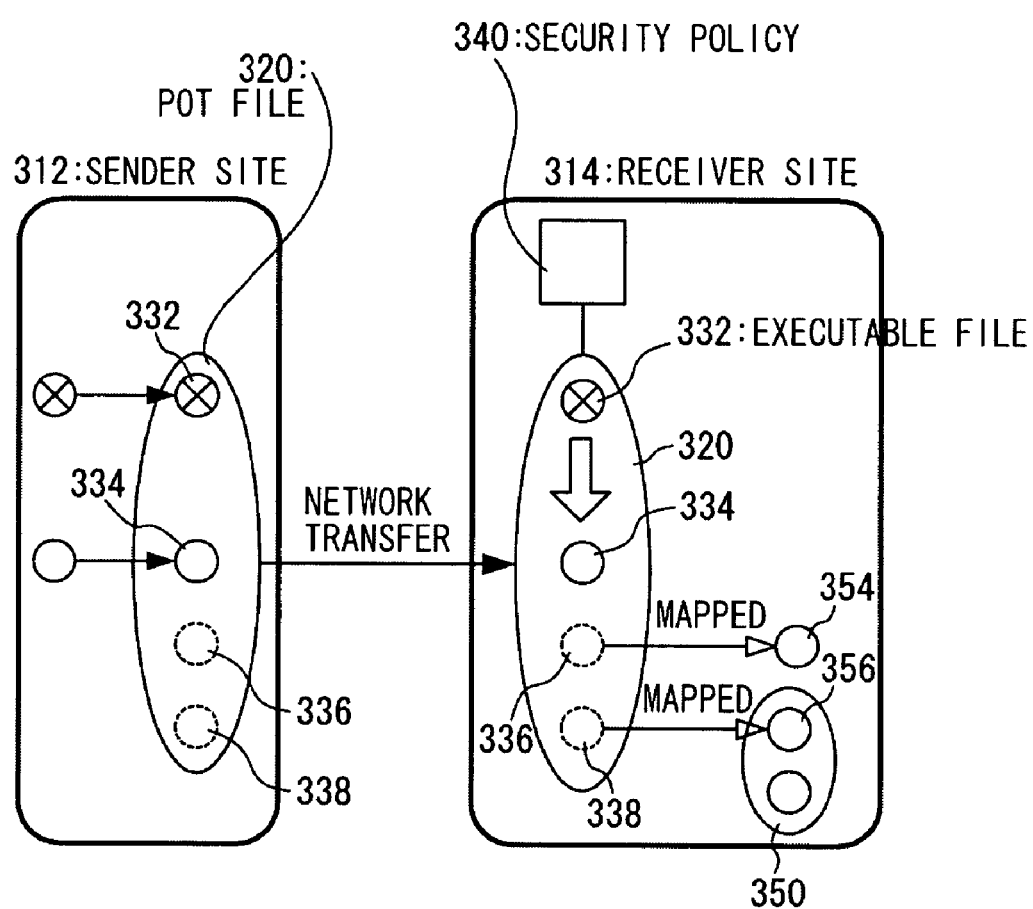
FIG. 7 is a diagram showing a typical software circulation model.

FIG. 7 illustrates a typical usage of the SSC model combining the four basic operations. In FIG. 7, at the sender site 312, one executable file (a circle containing a cross) 332 and one data file (a solid circle not containing a cross) 334 processed by the executable file are encapsulated. The remaining two files (broken circles) 336 and 338 do not physically exist in the pot 320 at the sender site, and their file entities are mapped in the receiver site at the execution time. This will be described later. The pot file 320 is transferred from the sender site 312 to the receiver site 314 via any transfer method such as FTP, WW, or e-mail.

At the receiver site 314, the user prepares a security policy description 340 that specifies the mapping schemes between the file in the pot and a local file and between the file in the pot and a file in another pot. This security policy 340 specifies that during the execution, no other files in the local file system of the receiver site can be seen. The security policy file 340 can also specify system calls of the OS kernel allowed to be issued in the execution. This security policy will be described later in detail.

At the receiver site 314, intangible files 336 and 338 within a pot may be mapped to a file 354 in a local file system or a file 356 within another pot 350 and processed using a file 334 in a pot or the mapped file 354 or 356 by executing a program 332, in conformity with the specification of the security policy 340. In this way, a pot forms a sandbox that is distinguished from the users' ordinary process execution environment.

Two slight extensions to the mapping operation are pointed out.

(1) Directory Mapping

The mapping of a directory in a pot to a directory in another pot or a local ordinary file system as shown in FIG. 8(a) is permitted. FIG. 8(a) shows that directories 362 and 364 in a pot 320 are mapped to a directory 366 in a local file system and a directory 368 in another pot 367, respectively.

(2) Cascade Mapping

Cascading of the mapping is permitted. The informal operational semantics of the cascade mapping is as follows. The cascade mapping operation results in a totally ordered relationship between multiple directories in pots and/or an ordinary file system. When the pathname of a file is retrieved through a mapping operation, the totally ordered directories are retrieved in the total order, and the first one found is the result. These extensions are useful in that they facilitate and simplify the description of security policies, and also make the computing of transferred pots more flexible. This is described using FIG. 8(b).

In FIG. 8(b), a directory 372 in a pot 320, a directory 392 in a pot 382, and a directory 396 in a pot 386 are subjected to cascade mapping in that order. In the mapping operation, each file in the directory 372 is mapped to the first one found after retrieval in the directories 392 and 396 in that order. As a result, in FIG. 8(b), three files in the directory 372 are mapped to two files in the directory 392 and a single file in the directory 396. The directory 372 in the pot 320 is mapped in a similar way.

(Utilization of the Secured Software Circulation (SSC) Model)

Now, how the SSC model can be applied to represent typical computation requiring secure software transfer in an open network environment is shown.

(1) Secure Interpretation of Downloaded Code

Figure 9:
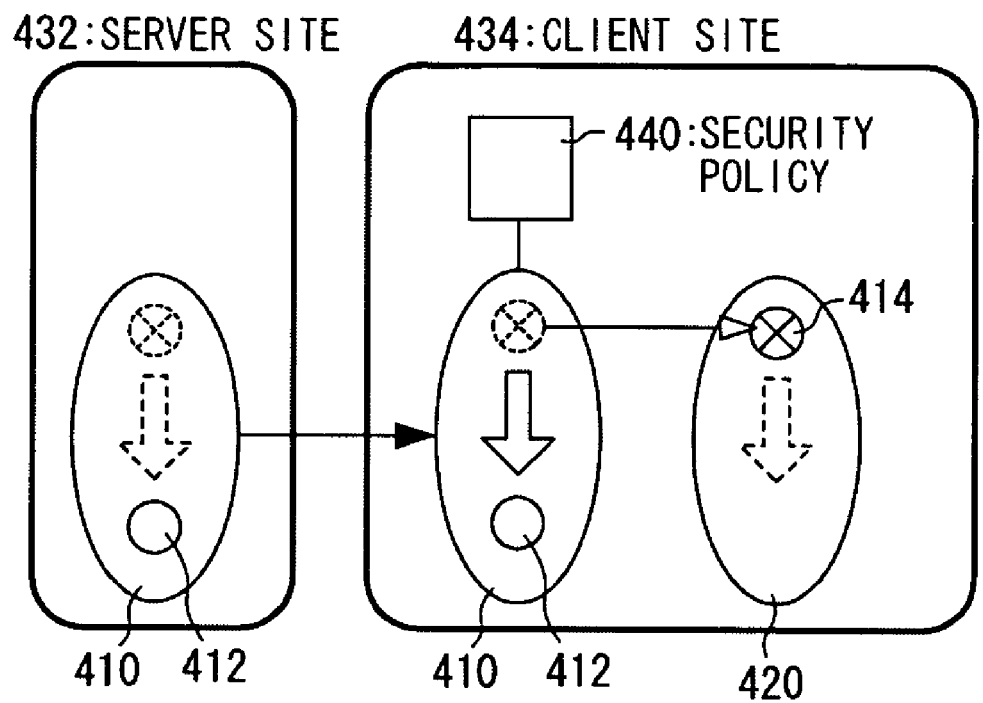
FIG. 9 is a diagram showing interpretation of a downloaded code.

A typical usage of SSC is the secure interpretation of downloaded codes. This form of computation has been made popular by the widespread use of Java and its applet system. SSC can be used to provide a general framework that enables secure interpretation of a downloaded code as shown in FIG. 9. In FIG. 9, a code file 412 is encapsulated into a pot 410 at a server site 432. The pot 410 that includes this code 412 is transferred to a client site 434, and interpreted by an interpreter 414 stored in a pot 420 of that site 434. Through the mapping operation, the pot 410 transferred to the client site 434 is associated with the interpreter entity 414. The code 412 is then interpreted and executed under the control of the related security policy 440 as if the interpreter appears in the pot 410 sent from the sender. Note that this framework for the secure interpretation of a downloaded code does not limit which programming language system or virtual machine instruction set can be used.

(2) Secure Execution of Dynamically Generated Native Code

Next, a more advanced form of downloaded code execution is described (FIG. 10). This form of computation is usually called execution by just-in-time (JIT) compilation.

In FIG. 10(a), a code 462 in a pot 460 downloaded from a sender site 432 to a receiver site 434 is compiled into a native code 466 to a CPU architecture of the receiver site 434 by a mapped compiler 464. The generated native code 466 is executed within the received pot 460 in conformity with the specification of the security policy 440 at the receiver site 434. If necessary, the execution result is mapped to a file 469 in a local file system.

In FIG. 10(b), the generated native code 466 is mapped into another pot 480 and executed within that pot 480 in conformity with the specification of the security policy 440.

As shown in FIG. 10, such computation is represented by simply combining the basic operations. Thus, a system implementing the SSC model is expected to be able to realize such relatively complicated computation in a systematic way.

(3) Secure Execution of Mobile Agents

Mobile agent systems represent one of the most sophisticated forms of distributed computation. Interestingly, this form of computation can be represented in a straightforward way, in principle, by using the SSC model.

Figure 11:
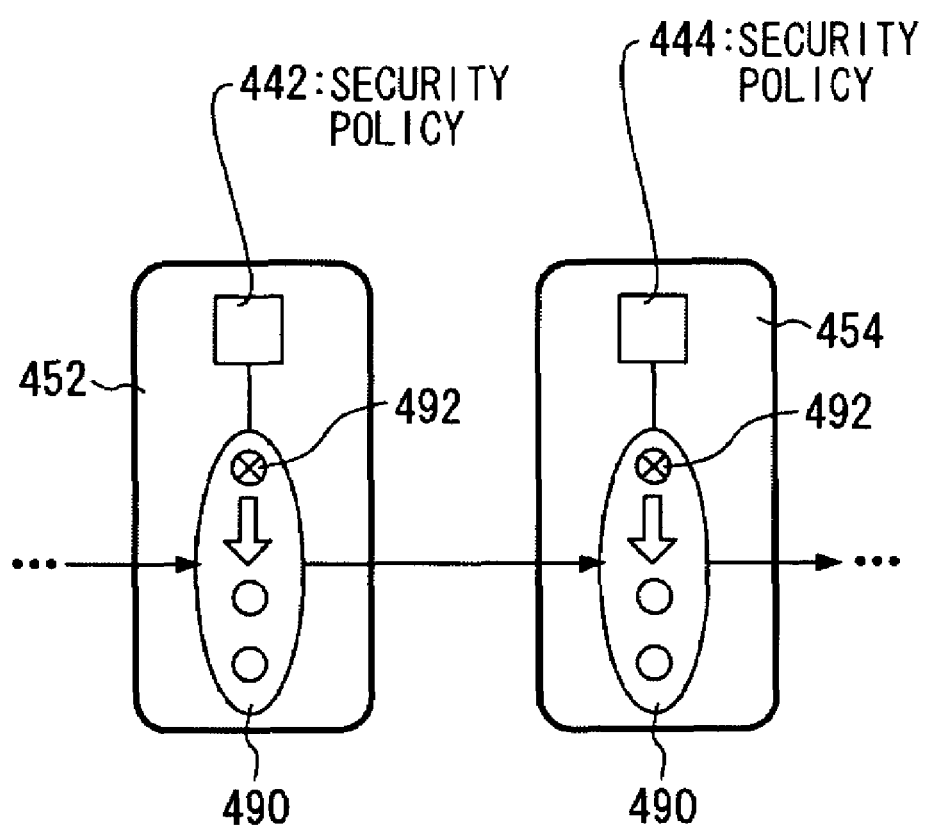
FIG. 11 is a diagram showing execution of mobile agents.

In FIG. 11, at the receiver sites 452 and 454, after receiving a pot 490, the program 492 stored in the pot 490 is executed within the pot environment of each site under the control of the specified security policies 442 and 444. This figure illustrates only the principle of mobile agent computation. More complicated settings will be required in real situations. For instance, files of a local file system at the receiver site may be mapped to the pot, the executed code may be interpreted as shown in FIG. 9, or the code may be executed using a JIT compiler as shown in FIG. 10.

(4) Secure Workflow Computing

A representation for secure workflow computation can be obtained by slightly modifying that for the secure mobile agent computation. The difference is that the program code is included in the transferred pot in mobile agent computation, while each executed program code is usually locally prepared at each computing site in workflow computation. Typical settings are shown in FIG. 12.

FIG. 12(a) shows that a pot 530, which includes files to be computed by executing a program, is transferred to each of sites 512 and 514, and those files are processed by executing program codes 522 and 542 in the pots 520 and 540 at each site. At each site, mapping the pots 520 and 540 that include the programs 522 and 542 to the transferred files in the pot 530 is carried out, respectively.

In FIG. 12(b), at each of sites 512 and 514, mapping the transferred pot 550 to the program codes 562 and 564 in each of sites 512 and 514 is carried out to process files within the pot.

(SoftwarePot: An Implementation of the SSC Model)

The SSC model described above can be implemented in several ways. This section describes a portable approach that does not modify the OS kernel. Instead, it uses functionalities extensively to interpret and manipulate issued system calls. Such functionalities are provided in many modern operating systems such as Solaris, Linux, and FreeBSD. The system designed based on this approach is called SoftwarePot. It supports the four basic operations of the SSC model described in FIG. 6. One of these operations, the transfer operation, can be implemented using any common network transfer method, such as FTP, Web, or e-mail. In the rest of this section, the implementation scheme for the three remaining operations using FIGS. 13 through 19 will be explained.

(1) Encapsulation Operation

The encapsulation operation is implemented by collecting files specified as encapsulated and storing these files in a pot-file. FIG. 13 shows an example of encapsulation specification. The static file section 610 preceded by the keyword 'static:' 612 specifies that the file of the local file system specified in the second column is stored in the pot-file with the pathname specified in the first column. For example, the second line 613 in FIG. 13 specifies that the local file /home/user1/picture/picA.jpg is stored in the pot-file with the pathname /data/pic1.jpg.

Figure 14:
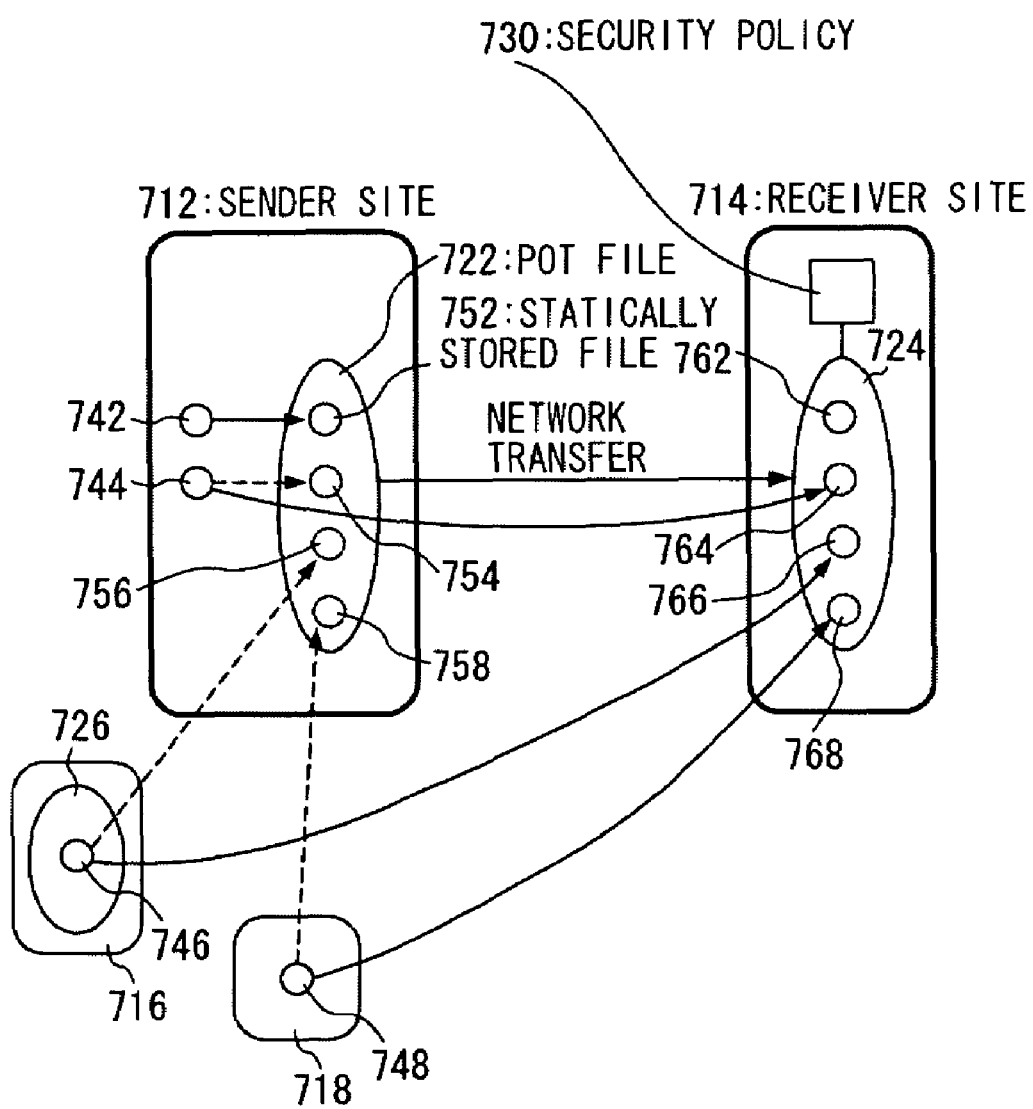
FIG. 14 is a diagram showing a dynamic file transfer.
Figure 15:
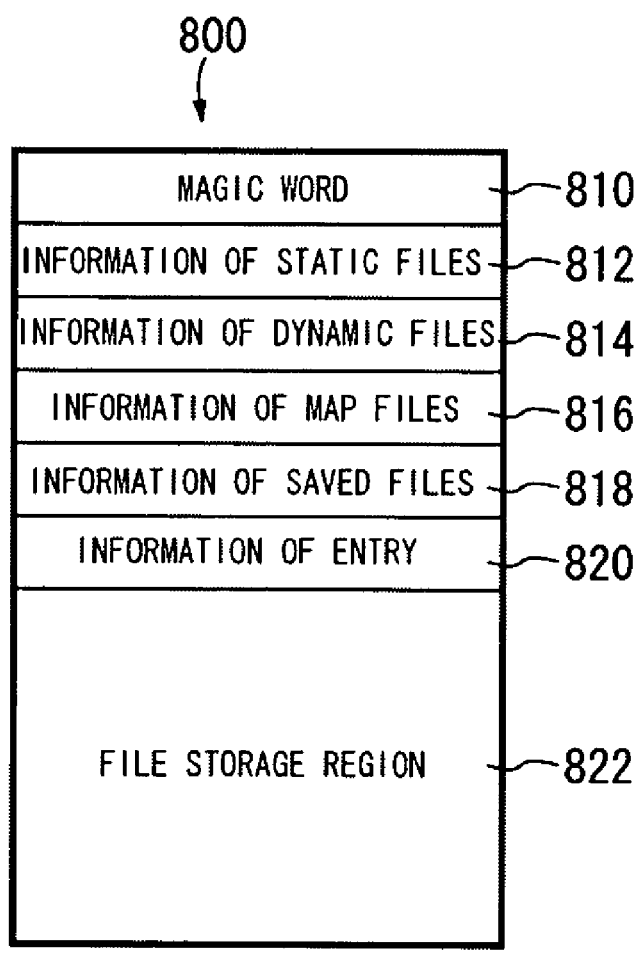
FIG. 15 is a diagram showing a file format.

This is described using FIGS. 14 and 15. In FIG. 14, a pot-file 722 is encapsulated at a sender site 712 and transferred to a receiver site 714 from the sender site 712. FIG. 15 shows an internal format 800 of a pot-file in the current implementation. Note that a magic word 810 in FIG. 15 is used to identify a pot-file.

In FIG. 14, a tangible file 742 in the sender site 712 is stored in the pot-file 722. This is called a statically stored file.

The pathname of the statically stored file in the static file section 610 (see FIG. 13) is stored in static file information region 812 of FIG. 15, and the file entity is stored in a region labeled as a 'file storage' region 822. To store a file in the file storage region 822, a module structure can be employed; for example, a tar, tar+gzip, or zip format is currently used. The stored format selection is completely transparent to a program to be executed in a pot-process by a mechanism, which will be described in the following section.

In addition to the basic function of statically storing a file in a pot-file, the SoftwarePot system has a function used to store only the original location of the files to be stored, and the contents of the files are dynamically transferred when required. This is specified in the dynamic file section 620 preceded by 'dynamic:' 622, which specifies encapsulation as shown in FIG. 13. In the example of FIG. 13, the file of pathname /mybin/viewer_plugin1 in the line 624 should be obtained from the location specified by the URL http://www.foo.com/viewer_plugin1, and the file /mybin/viewer_plugin2 in the line 626 should be obtained from the location /home/user1/bin/viewer_plugin2 at the site where the pot-file is created.

FIG. 14 shows that pathnames (and URLs of sites in the case of another site) of a file 744 at the sender site 712, a file 746 stored in a pot 726 at another site 716, and a file 748 at another site 718 are stored in a pot 722 in the encapsulation operation. Those files are obtained when they are required at the execution time at the receiver site 714. In FIG. 15, such information is included in information on dynamic files 814 of the file format 800.

The static method is useful for storing absolutely necessary files, while the dynamic method is useful for storing optionally necessary files and for reducing the size of a pot-file.

The section 630 preceded by 'required:' 632 specifies which files or directories must be mapped at the execution time. In FIG. 13, the example specification specifies that directories /var 634 and /extern_world 636 must be mapped at the execution time. In FIG. 15, such information is included in information on map files 816 of the file format 800.

The section 640 preceded by 'saved:' 642 specifies that the modification of files in the listed directories should be permanently reflected in the pot-file system; and that the modification of other files is only temporarily reflected within the execution session and is thrown away after the session. The section 650 preceded by 'entry:' 652 specifies the default program file (see 654 in FIG. 13) that is first to be executed. In FIG. 15, such information is included in information on saved files 818 and information on entries 820 of the file format 800.

(2) Mapping and Execution Operations

The implementation of the mapping and execution operations is integrated in the SoftwarePot system, thus they will be described together.

The essence of both operations is name translation; that is, every primitive operation to manipulate files (such as open, read, write, lseek, close system-calls) is redirected to the mapped destination file. FIG. 16 illustrates this name translation scheme. All the file accesses in the pot—whether to mapped files or to unmapped files—can be treated uniformly through the mapping since the files stored statically in a pot-file are extracted entering the local file system by the time they are accessed.

In FIG. 16, in the middle of the initial setting of a pot-process 910, the name translation scheme is prepared according to a mapping and security policy description. When the pot-process 910 accesses a file written by a program, files 932 and 934 in a pot 930, files 944 and 952 in a pot 940 in the local file system are accessed by the name translation. In addition, another process 960 is accessed via inter-process communication (IPC) or another site 970 is accessed via a network protocol such as HTTP.

Furthermore, a temporary file 982 created by another process 980 can be accessed. This function allows limitation on information that can be revealed in the pot-process 910, or a disguised file not actually existing to appear in the pot-process 910.

The file system space viewed from a pot-process 910 is a virtual one created in conformity with the name translation specification, and the pot-process 910 can never directly see the 'real' file system of the executing operating system.

For the extraction, there are two modes: the eager extraction mode and the lazy extraction mode. In the eager extraction mode, all the files statically stored in a pot-file are extracted at once when the execution operation is initiated. In the lazy extraction mode, on the other hand, each file is extracted only when it needs to be accessed.

How to describe a specification for name mapping and security policy in SoftwarePot is explained using the example shown in FIG. 17.

The 'map:' section 1010 specifies that each file or directory in the pot-file specified in the first column is mapped to the existing files or directories specified in the second column. In the example, the line '/etc/termcap /lib/tools.pot:/etc/termcap' specifies that the '/etc/termcap' file accessed in the pot-process is redirected to the file having the same name in the pot-file named '/lib/tools.pot'. The line '/alpha /beta,/gamma,/delta' shows a way to specify cascade mapping. For instance, accesses to the file '/alpha/x' will be redirected to either file '/beta/x', '/gamma/x', or '/delta/x', where in this file selection, '/beta/x' has the highest priority and '/delta/x' has the lowest.

The 'temporary:' section 1020 specifies that the execution output of a program specified by an initiation command '/sbin/account_processing/users all' is stored in a temporary file, and a file named '/etc/account' in the pot-process is mapped to that temporary file.

The 'indirect:' section 1030 specifies a special mapping function called 'process mapping'; that is, inputting and outputting files in a pot-process is redirected to interprocess communication. In the example, '/etc/passwd /home/user2/bin/passwd_filter' specifies that accesses the file '/etc/passwd' in the pot-file is redirected to interprocess communication with the process initiated by the command '/home/user2/bin/passwd_filter'.

As described above, a function specified by the 'indirect:' section maps interprocess communication with the initiated process as if it is a file; while a function specified by the 'temporary:' section stores an execution result output in a temporary file, and maps it to that temporary file. When costs (time and file capacitance) for generating the temporary file are low, the 'temporary:' section function should be used, otherwise, when high, the 'indirect:' section function should be used. In addition, the 'indirect:' section function is more dynamic, therefore, the contents can be generated dynamically. Note that the temporary file contents must be generated by the program specified in the 'temporary:' section before the mapping operation.

The remaining sections 1040 and 1050 are used for specifying the security policy. In the 'network:' section 1040, the example specifies that all communication-related system calls are prohibited, with exception that connection to TCP-port 80 of IP address 130.158.80.*, connection to TCP-port 21 of 130.158.85.97, and bindings to TCP-port 22 of '*.tsukuba.ac.jp' are allowed.

On the other hand, the 'syscall:' section 1050 specifies the permission given for system calls other than network-related ones. In the example, all system calls other than network-related ones and those listed in the last two lines (preceded by the keyword 'deny') are allowed.

Figure 18:
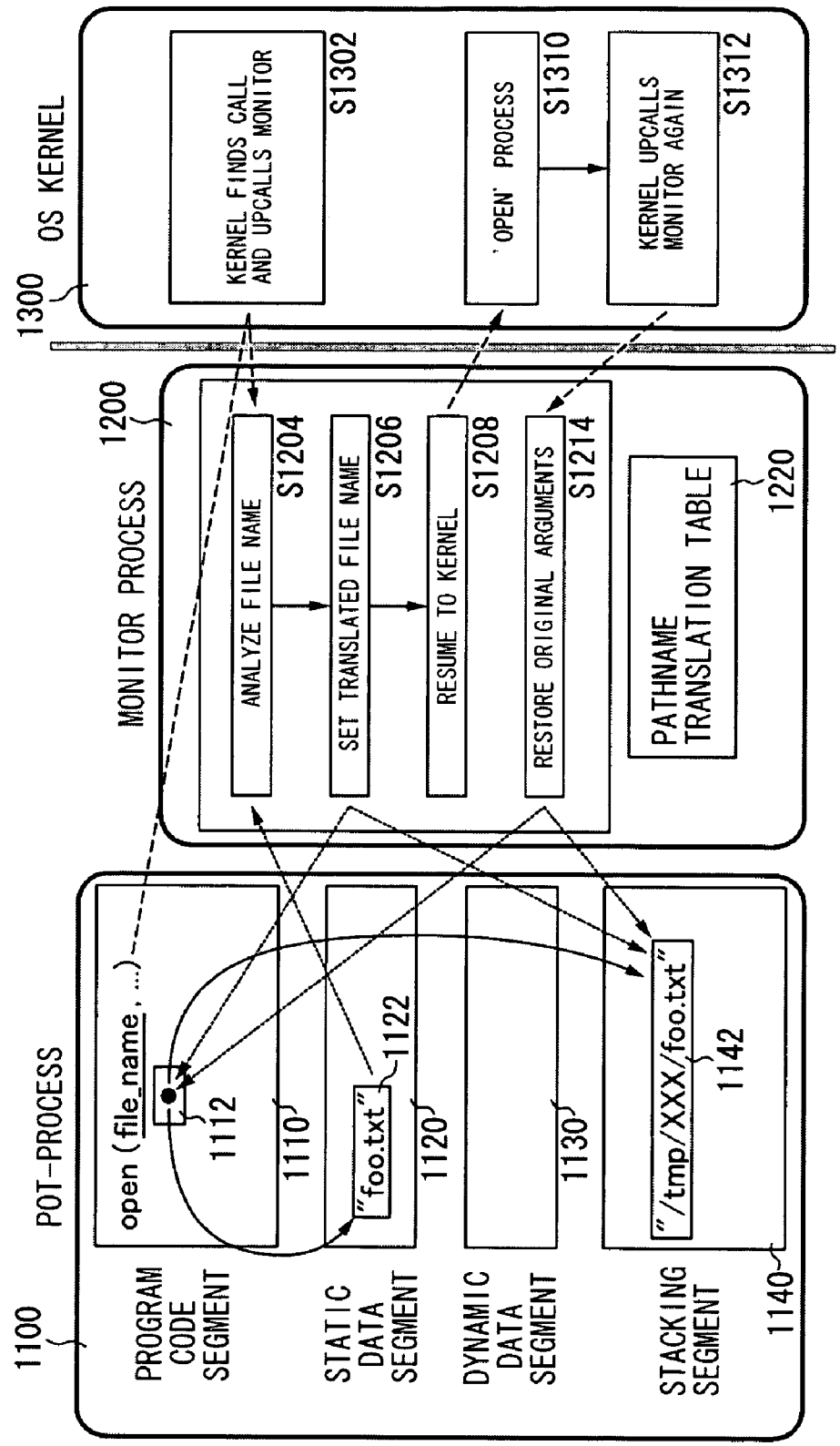
FIG. 18 is a diagram showing an implementation trick for name translation.

Now implementation of the name translation is explained using FIG. 18. This trick is to rewrite an argument for the open system call issued in the pot-process 1100 as:

open("/foo.txt", . . . ) ------> open("/tmp/XXX/foo.txt", . . . )

at the execution time.

Most modern operating systems support functions to intercept system calls just before and after the execution of the calls in the OS kernel, and for user-level code to be executed upon each interception. Also, modern OSs allow a user process to examine and modify the contents of another user process in a controlled manner. By combining these functions, a required name mapping mechanism is implemented transparently without modifying the OS kernels.

In FIG. 18, as the initial setting, a monitor process (monitor for short) 1200 is initiated and associated to a pot-process 1100 to monitor the execution. The setting for name mapping is recorded in a pathname translation table 1220 in FIG. 18.

When a pot-process 1100 issues an open system call, a kernel 1300 catches the call and calls up the monitor (S1302). The monitor 1200 looks into the contents of the pot-process 1100 and obtains the pathname 1122 of the file being opened (S1204). By referring to the pathname translation table 1220, the monitor 1200 decides to which actual file the open system call should be applied. If the lazy file extraction mode is specified, the file is extracted from the file storage region in the pot-file; if cascade mapping is specified, file-retrieving is done according to the specified totally-ordered directory list; if dynamic file transfer is specified in the mapping specification, an appropriated file is obtained via the network; if the 'indirect:' option is specified, a specified process is initiated and inter-process communication between the pot-process and the initiated process is established.

The monitor process 1200 writes the translated pathname 1142 to the unused area (a stacking segment 1140 in FIG. 18) in the pot-process 1100, and rewrites the register storing a pointer to the pathname so as to reference the translated filename 1142 (S1206). Just before rewriting the register, the monitor process saves its content to be restored later.

The monitor 1200 then instructs the kernel 1300 to perform the actual processing for open (S1208). The kernel 1300 performs the processing for open (S1310). The kernel 1300 again calls up the monitor 1200 (S1312). The monitor 1200 restores the content of the register and erases the translated pathname written in step S1206 (S1214). Finally, the monitor 1200 instructs the kernel 1300 to resume execution of the pot-process 1100.

Figure 19:
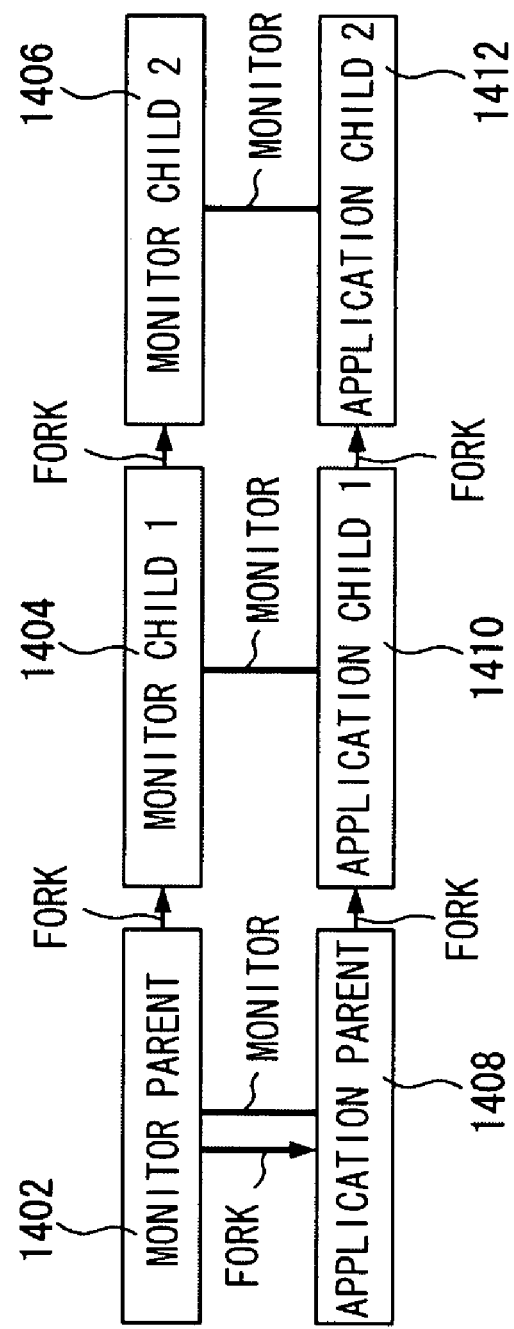
FIG. 19 is a diagram showing implementation of monitor forks.

During the execution, the pot-process may issue a fork system call and spawn other pot-processes. This is described using FIG. 19. In FIG. 19, if allowed by the security policy description, the pot-process 1408 may spawn the pot-process 1410 by issuing a fork system call. At this time, the monitor 1402 will also fork and the child monitor process 1404 will monitor the child pot-process 1410.

(Secure Software Circulation)

When executing software in the SoftwarePot, behavior of that software is monitored. When the software behaves contrary to the user's intention, the user must determine either abnormal termination or permission for continuation of that behavior. The security policy to specify the above must be created for each software. The user knowledgeable on the computer system may create that security policy. For a user other than the above, a third-party organization must be able to create a security policy. The relationship therebetween is described using FIG. 20.

Figure 20:
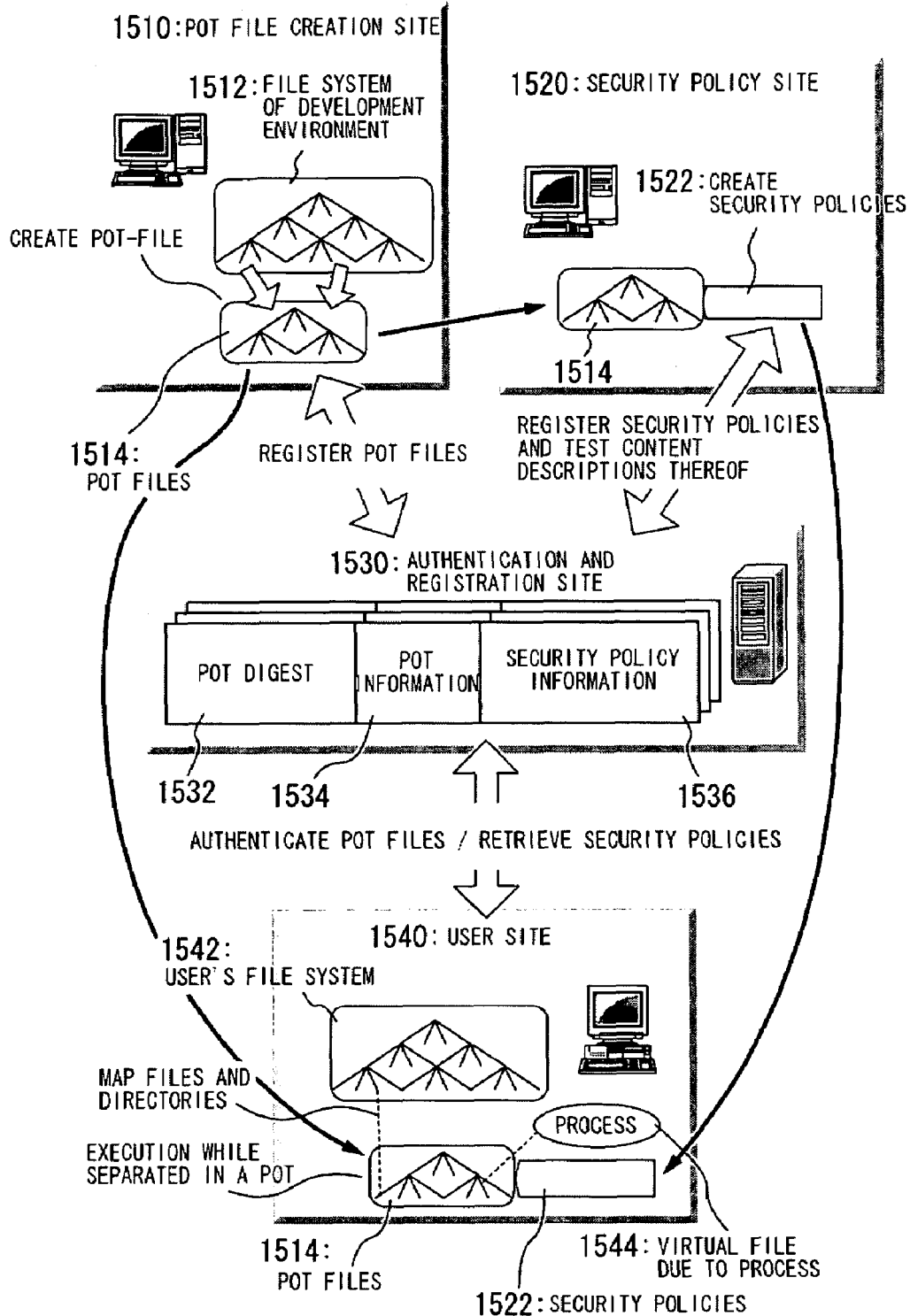
FIG. 20 is a diagram showing a secure software circulation model.

In FIG. 20, software is created at the pot-file creation site 1510 as a pot-file 1514. A software creator registers a SoftwarePot 1514 to an authentication station (authentication/registration site 1530) before software distribution. This registration is carried out by obtaining a digest of the SoftwarePot, and registering a pot digest 1532 and pot information 1534 to the authentication station.

In addition, a creator who created the security policy for that software (see a security policy site 1520 in FIG. 20) registers the security policy and target software to the authentication station 1530. A SoftwarePot user generates the digest of that SoftwarePot, sends that digest to the authentication station, and retrieves the security policy registered by that digest as a key (see a user site 1540 in FIG. 20). When there are multiple registrations, the most appropriate one may be selected therefrom. A software creator, an authentication station, a test code provider, and a user are not limited to independent organizations; alternatively, a combination of two or more thereof may be the same organization.

Those processes are described in detail using FIGS. 21 through 29.

(Pot-File Registration)

Figure 21:
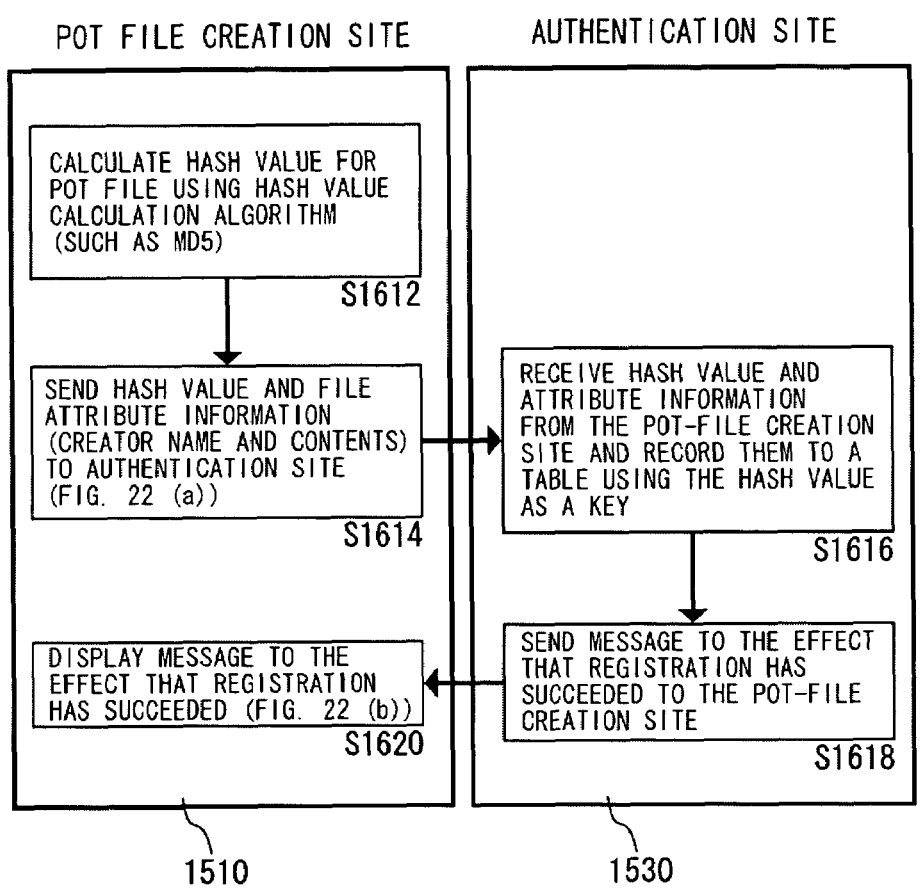
FIG. 21 is a flowchart showing a file registration process.

Registration of a pot-file with the pot-file creation site 1510 and the authentication/registration site 1530 of FIG. 20 is described using FIGS. 21 and 22.

In FIG. 21, to begin with, a pot-file creator specifies a pot-file to be registered, and calculates a digest thereof using a hash value calculation algorithm such as MD5 (S1612). By pressing a send button 1636 shown in FIG. 22(*a*), the calculated pot-file digest (hash value) as well as to pot-file attributes (a creator and contents) displayed in transmission content area 1632 are sent to the authentication/registration site 1530 for registration (S1614). The authentication/registration site 1530 receives the digest (hash value) and attribute-information, registers tables 1532 and 1534 based on that hash value as a key (S1616), and informs the file creation site 1510 that registration has succeeded (S1618). The pot creator may know completion of registration from the window 1640 in FIG. 22(*b*).

(Security Policy Registration)

Figure 24:
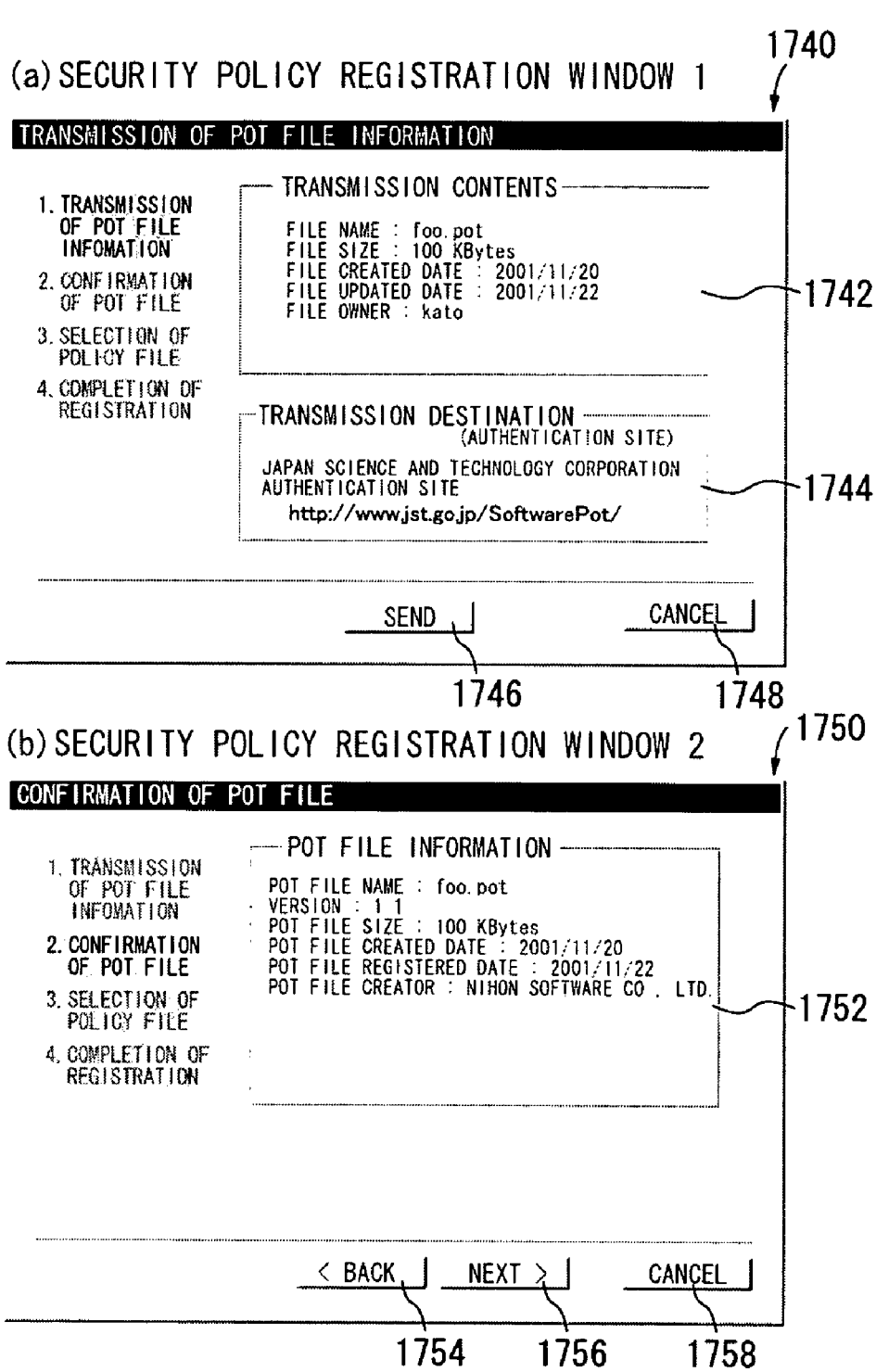
FIG. 24, consisting of FIG. 24(a) to 24(b), is a diagram showing a security policy registration process window.
Figure 25:
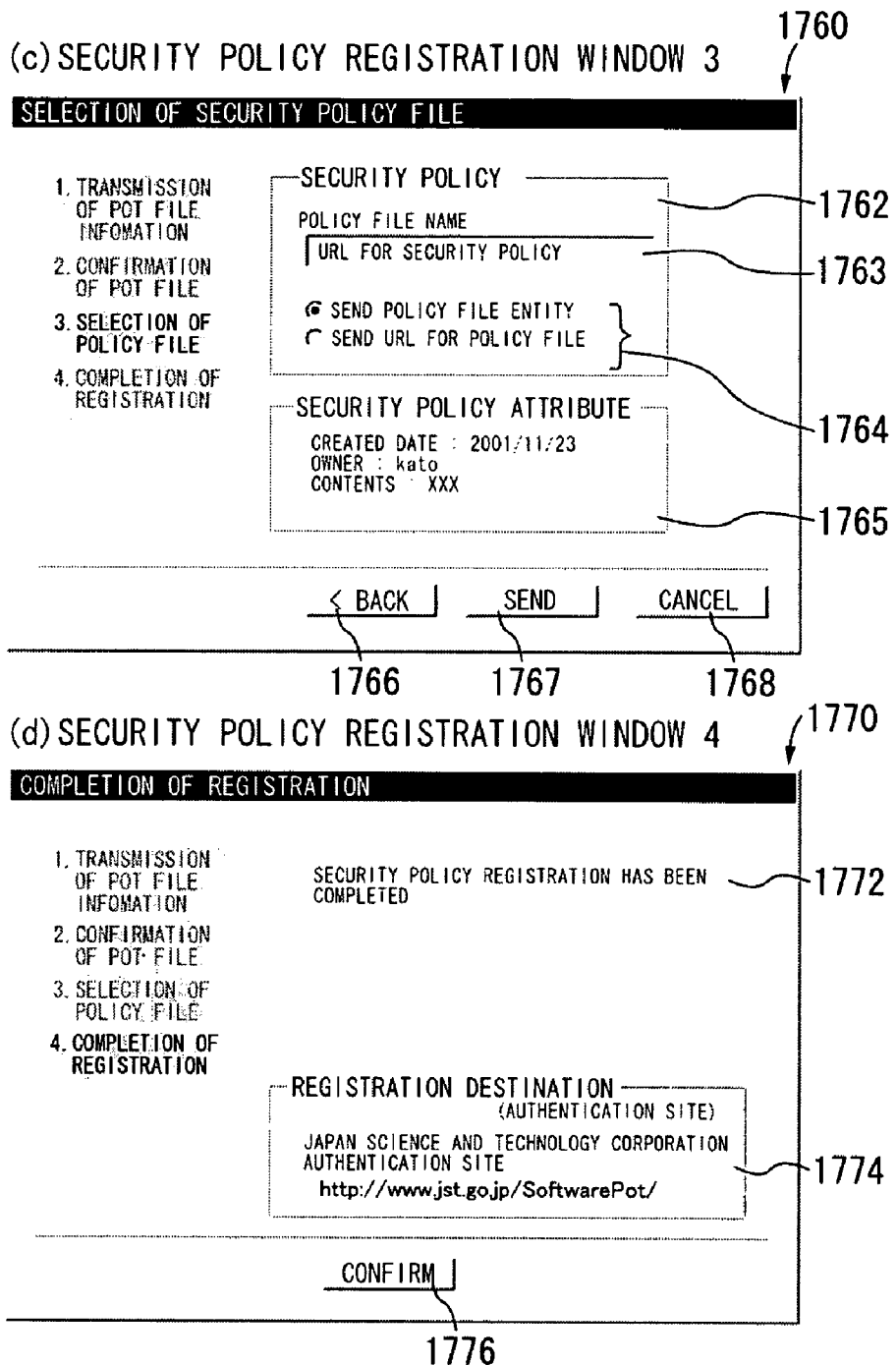
FIG. 25 is a diagram showing a security policy registration process window.
Figure 26:
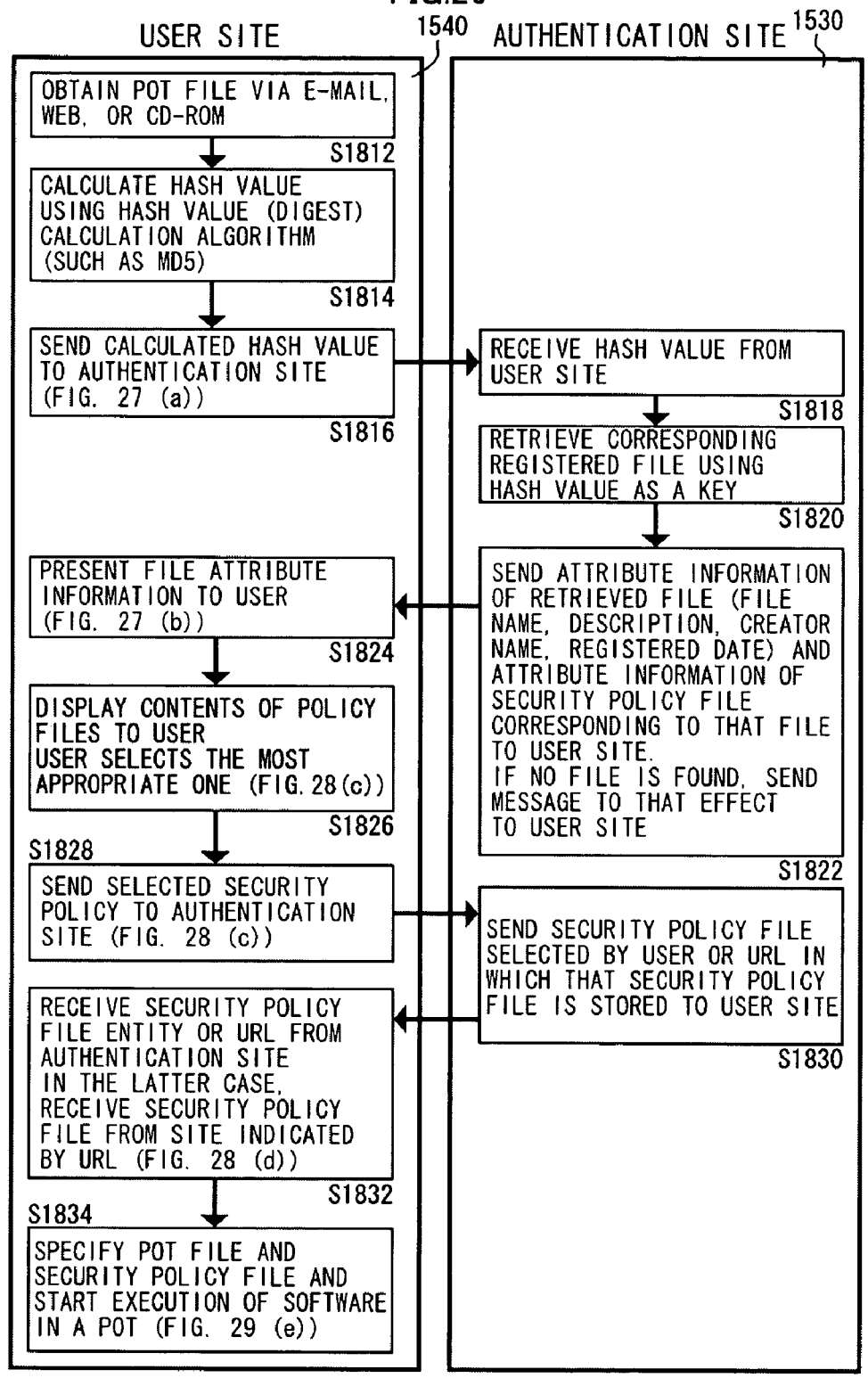
FIG. 26 is a flowchart showing a file retrieving process.

The registration of a security policy by the security policy site 1520 and the authentication/registration site 1530 in FIG. 20 is described using FIGS. 23 through 25.

To begin with, a creator who created the security policy corresponding to the obtained pot-file calculates a hash value or a digest of that pot-file using an algorithm such as MD5 for registration of that created security policy (S1712 and S1714). By pressing a send button 1746 in a window 1740 of FIG. 24(*a*), the calculated digest (hash value) 1742 is sent to the authentication site 1530 for authentication and retrieval (S1716). When receiving the hash value (S1718), the authentication site 1530 retrieves using that value as a key to obtain pot-file information (S1720). If the information is obtained, the obtained pot-file is authenticated. The Attribute information of the obtained pot-file is sent to the security policy site 1520. When no pot-file is found, a message to that effect is sent to the site 1520 (S1722). Attribute information of the received pot-file is presented to the user using a window shown in FIG. 24(*b*) (S1726). The user confirms pot-file authentication from the pot-file attribute-information, and then registers the created security policy. This registration is carried out by selecting either the security policy entity or the URL for the security policy site 1520 using a radio button 1764 in a window 1760 of FIG. 25(*c*), and sending that selection to the authentication site 1530 (S1728).

After reception, the authentication site 1530 registers that received security policy entity (file) or the URL so that it is associated with the pot-file (S1730), and informs of completion of registration in the window 1770 shown in FIG. 25(*d*) (S1732). The user may confirm registration from that window 1770 (S1734).

(Downloading Security Policy)

Pot-file authentication at the user site 1540 and the authentication/registration site 1530 of FIG. 20 and downloading corresponding security policy are described using FIGS. 26 through 29.

A user obtains a pot-file via e-mail, Web, or CD-ROM (S1812). To do this, authentication that this file is not infected by, for example, a virus, and a corresponding security policy must be obtained. Accordingly, to begin with, a digest (hash value) of the obtained pot-file is calculated by MD5, for example (S1814). By pressing a send button 1846 in a window 1840 of FIG. 27(*a*), this digest (hash value) is sent to the authentication/registration site 1530 for authentication of the pot-file (S1816). The authentication/registration site 1530 receives the digest (hash value) for the pot-file (S1818) and retrieves a registered file using that hash value as a key (S1820). When pot-file retrieval succeeds, the pot-file is authenticated. The attribute information of the retrieved pot-file and Attribute information of the registered security policy file are sent to the user site 1540 (S1822). When a pot-file is not found, a message to that effect is sent to the user site 1540 (S1822).

Figure 27:
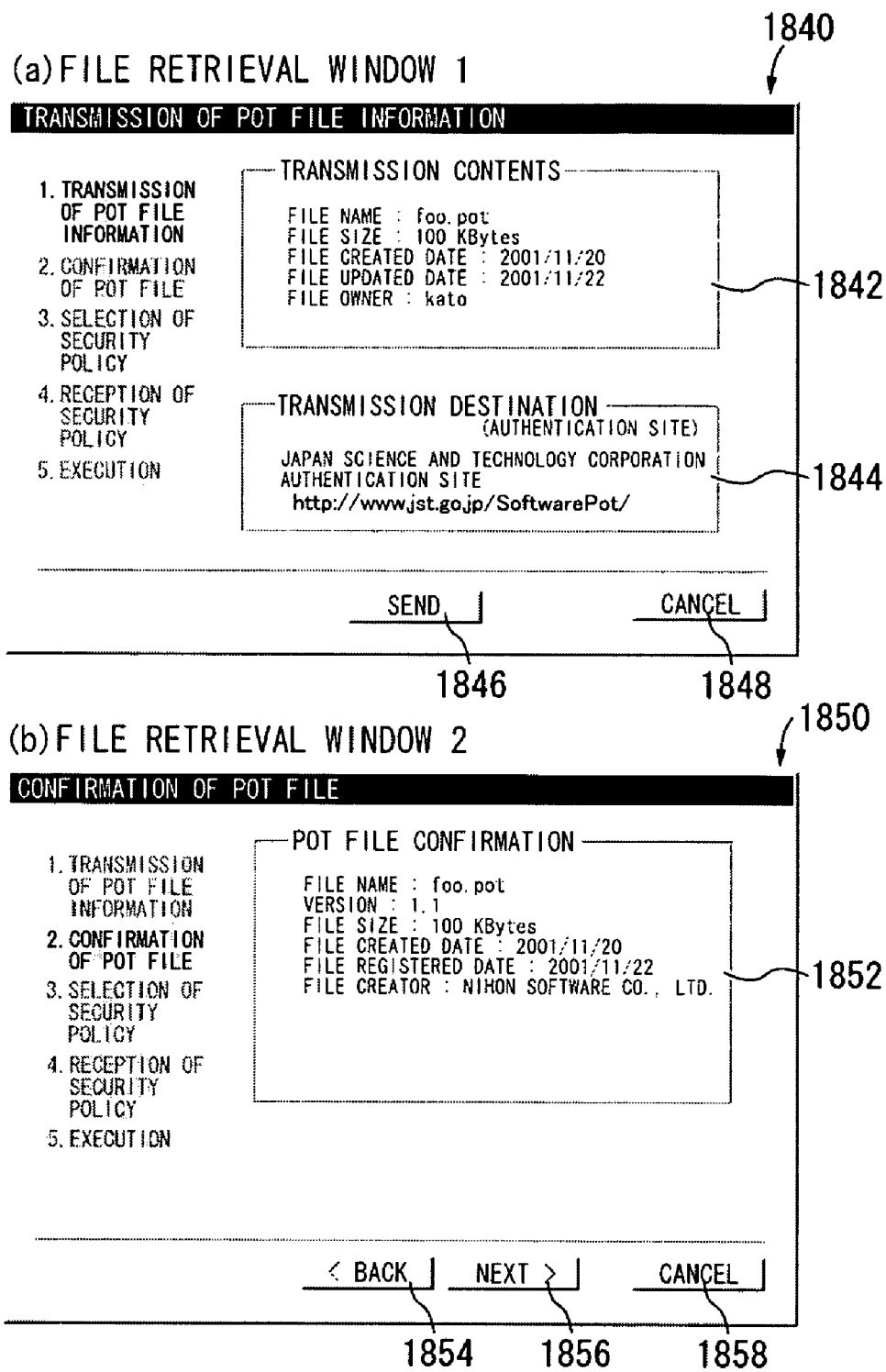
FIG. 27, consisting of FIG. 27(a) to 27(b), is a diagram showing a file retrieving process window.
Figure 28:
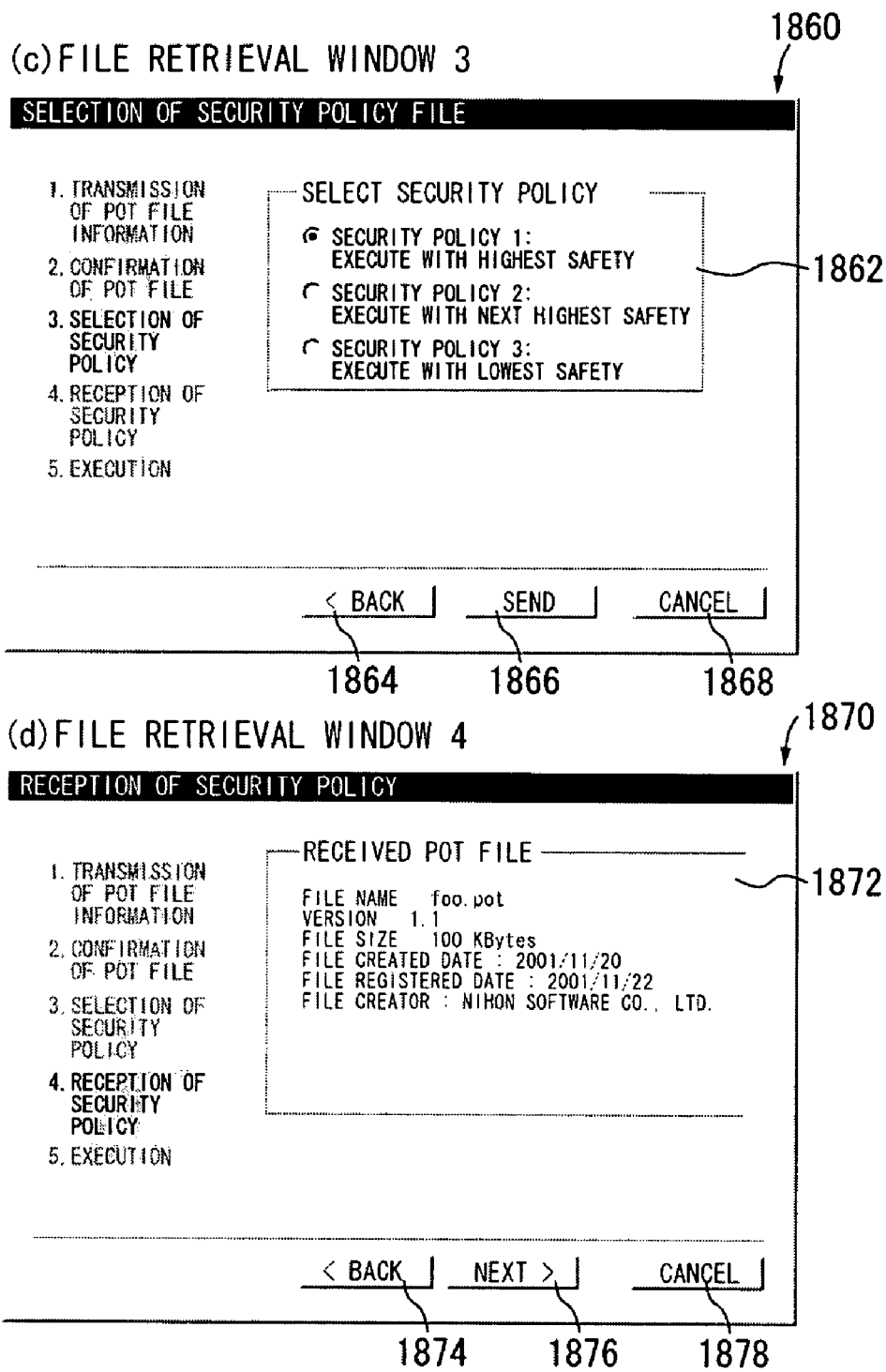
FIG. 28, consisting of FIG. 28(c) to 28(d), is a diagram showing a file retrieving process window.
Figure 29:
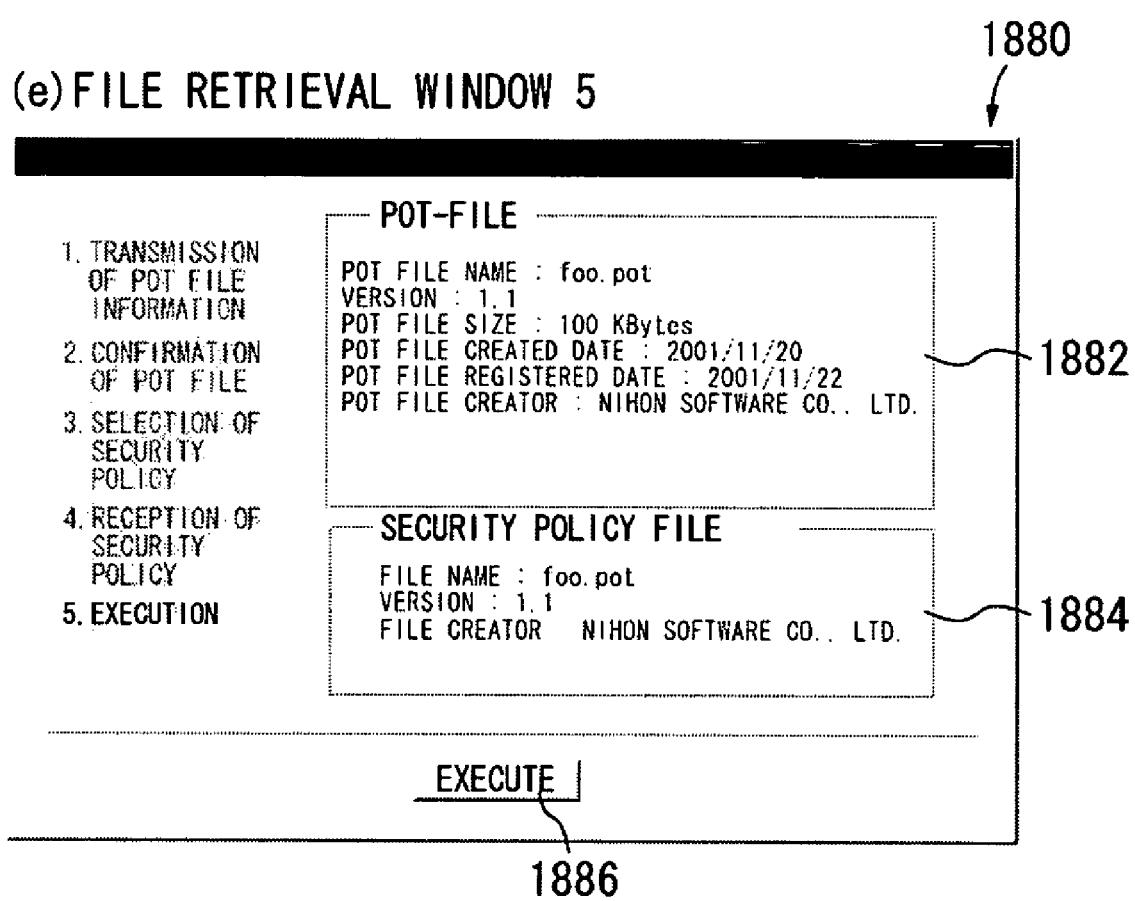
FIG. 29 is a diagram showing a file retrieving process window.

At the user site 1540, the received file attribute information 1852 is displayed as shown in an exemplary window 1850 of FIG. 27(*b*) (S1824). The pot-file authentication is completed and the security policy is then downloaded to securely execute that pot-file. Since multiple security policies are registered, one such as a radio button 1862 in a window 1860 of FIG. 28(*c*) is selected (S1826) while considering safety, and that selection is then sent to the authentication site 1530 (S1828). The authentication site 1530 receives this, and sends either the security policy entity or the URL to the user site 1540 (S1830). The user site receives the security policy. In the case of the URL, the security policy is downloaded by accessing that URL site (S1832). The obtained pot-file may then be securely executed using the security policy by pressing an execution button 1886 shown in an exemplary window 1880 of FIG. 29(*e*) (S1834).

(Experiments)

The SoftwarePot system is implemented in the Solaris 5.6 operating system based on the implementation scheme described above (see Table 1). About 5,000 lines of C program code were required for implementation. This section describes the experimental results obtained from the implementation. The hardware platform was a Sun Ultra 60 workstation (CPU: UltraSPARC II, 4 MB Cache Memory, 512 MB main memory, 36 GB hard disc).

TABLE 1

| Operation | Implementation Method | Current Implementation |
|---|---|---|
| Encapsulation | Data archiving/storing format | Modular |
| Transfer | Data transfer method | Static (transfer before execution) Dynamic (transfer during execution) |
| Mapping | Name mapping method File extraction method | System call interception Eager (extract before execution) Lazy (extract during execution) |

Three microbenchmark programs were written and the overhead imposed on system calls was identified by comparing the execution time for these programs with and without SoftwarePot. The benchmark programs were as follows:

(1) Fib

This program calculates a Fibonacci number. It invokes no system calls while calculating.

(2) Getpid-Caller

This program calls the 'getpid' system call repeatedly in its main loop (10 million times), but does not invoke any other system call.

(3) Open-Caller

This program repeats an operation that opens the same file and immediately closes it. It invokes pathname system calls many times: it executes 10,000 pairs of an open system call and a close system call.

The eager extraction mode is used in this experiment. The file extraction times in the above programs were extremely small and are not included in the results shown. Experimental results are given in Table 2.

TABLE 2

|  | Fib | getpid-caller | open-caller |
|---|---|---|---|
| Without SoftwarePot | 13,415 | 10,620 | 192 |
| With SoftwarePot | 13,477 | 14,739 | 8,438 |

In Table 2, the performance of Fib was little influenced by whether it ran with SoftwarePot. This was quite natural because the monitoring process in SoftwarePot intercepts nothing but system calls. 'Getpid-caller' was slower when it ran with SoftwarePot. This was unexpected because 'getpid' is not a pathname system call, and such calls are never intercepted. When some system calls are configured for interception, a certain overhead is assumed to be added to all system calls. The benchmark 'open-caller' ran an order of magnitude slower with SoftwarePot (the difference in overall execution time was 8,246 milliseconds). Since 'open-caller' invoked 'open' 10,000 times, the penalty paid for each 'open' was about 0.8 milliseconds. Since the amount of computation by executing the software when intercepting one pathname system call does not depend on the kind of system call, the same penalty will be paid for all pathname system calls.

(File Access Control Function)

As described above, the secure software execution system of the present invention allows execution of software separated within a pot-file while verifying safety. This allows assurance of the safety for user's computer resources even if malicious operation or malfunction occurs when introducing and executing software.

In addition, the system of the present invention provides a function to dynamically determine a file obtaining method and a file generation method when circulating a file. This allows implementation transparent to application (i.e., unbeknown to application), of obtaining a file at the execution time by storing not only a file entity, but also a file location or a dynamic file obtaining method when storing a file in SoftwarePot.

However, there is another problem with the conventional file circulation in that giving file access authority (read-out or write-in authority) to a specific user has not yet been implemented transparently to application.

To solve this problem, a file access control function can be added to the secure software execution system of the present invention. The file access control function is a function to give reading out and writing in authorities of a file only to a predetermined user. This function can be implemented through the following steps (1) and (2).

(1) In the encapsulation operation when creating a pot-file, access control specification is described in the encapsulation specification.

(2) File entities and keys are encrypted/decrypted using an encryption technique.

In the following, the above step (1) is described first, and then step (2).

(1) Description of Access Control Specification

As described in section (1) Encapsulation operation of (SoftwarePot: SSC Model Implementation), the encapsulation operation is implemented by collecting files specified as encapsulation targets and storing those files in a pot-file. In the above description, an example of encapsulation specification is described using FIG. 13.

FIG. 30 shows an example of access control specification being added to the encapsulation specification shown in FIG. 13. In FIG. 30, exemplary descriptions including access control specification are shown in lines 618 (fourth through sixth lines in the static file section 610) and lines 628 (fourth through sixth lines in the dynamic file section 620). Note that a symbol '¥' at the end of a line indicates that description continues in the next line.

In the lines 618 of FIG. 30, the first line specifies that a static file /home/user1/picture/picC.jpg or a local file is stored in a pot-file with a pathname /data/pic3.jpg, as described above using FIG. 13. The following second and third lines specify access control to that file. The second line 'read={kato@orange.com, yosh@banana.com}' indicates that the read-out authority of this file is given to kato@orange.com and yosh@banana.com. In addition, the third line 'write={kato@oragne.com}' indicates that the write-in authority of this file is given to kato@orange.com.

Similarly, in the lines 628 of FIG. 30, the first line specifies that a dynamic file /mybin/viewer_plugin3 should be obtained from a location specified by a URL http://www.foo.com/viewer_plugin3. The following second and third lines specify access control to that file. The second line 'read={kato@orange.com, yosh@banana.com}' indicates that the read-out authority of this file is given to kato@orange.com and yosh@banana.com. In addition, the third line 'write={kato@oragne.com}' indicates that the write-in authority of this file is given to kato@orange.com.

Note that in FIG. 30, a hybrid file section 660 preceded by 'hybrid:' 662 is an exemplary specification regarding a hybrid file. The hybrid file has a combinational function of a static file and a dynamic file. The hybrid file specifies a single file entity corresponding to a static file and one or more file entities corresponding to a dynamic file. When creating a pot-file, a file entity is stored in a pot-file based on a file entity obtaining method corresponding to the specified static file. When using a pot-file, obtaining a file entity is attempted based on a file entity obtaining method corresponding to the specified dynamic file. Note that if there are multiple file entity obtaining methods corresponding to the dynamic file, implementation follows the priority order (e.g., the first one described has the highest priority). When an attempt to obtain a file entity fails, the file entity stored as a static file is used.

The lines 664 or the second through fourth lines in the hybrid file section 660 specify registration, as a hybrid file /mybin/viewer$_{13}$ pluginA, of two files (the priority decreases from left to right): http://www.foo.com/viewer_pluginA__1 and http://www.foo.com/viewer_pluginA__2, which are specified by 'dynamic=' as dynamic files, and a file http://www.foo.com/viewer_pluginA_1, which is specified by 'static=' as a static file.

Note that specifications other than those described above in FIG. 30 are the same as those in FIG. 13.

(2) Access Control Using Encryption Technique

A pot-file creator may specify users having read-out or write-in authority of a file entity by describing access control specification as shown in the above step (1). The specified access control is implemented using an encryption technique.

Figure 31:
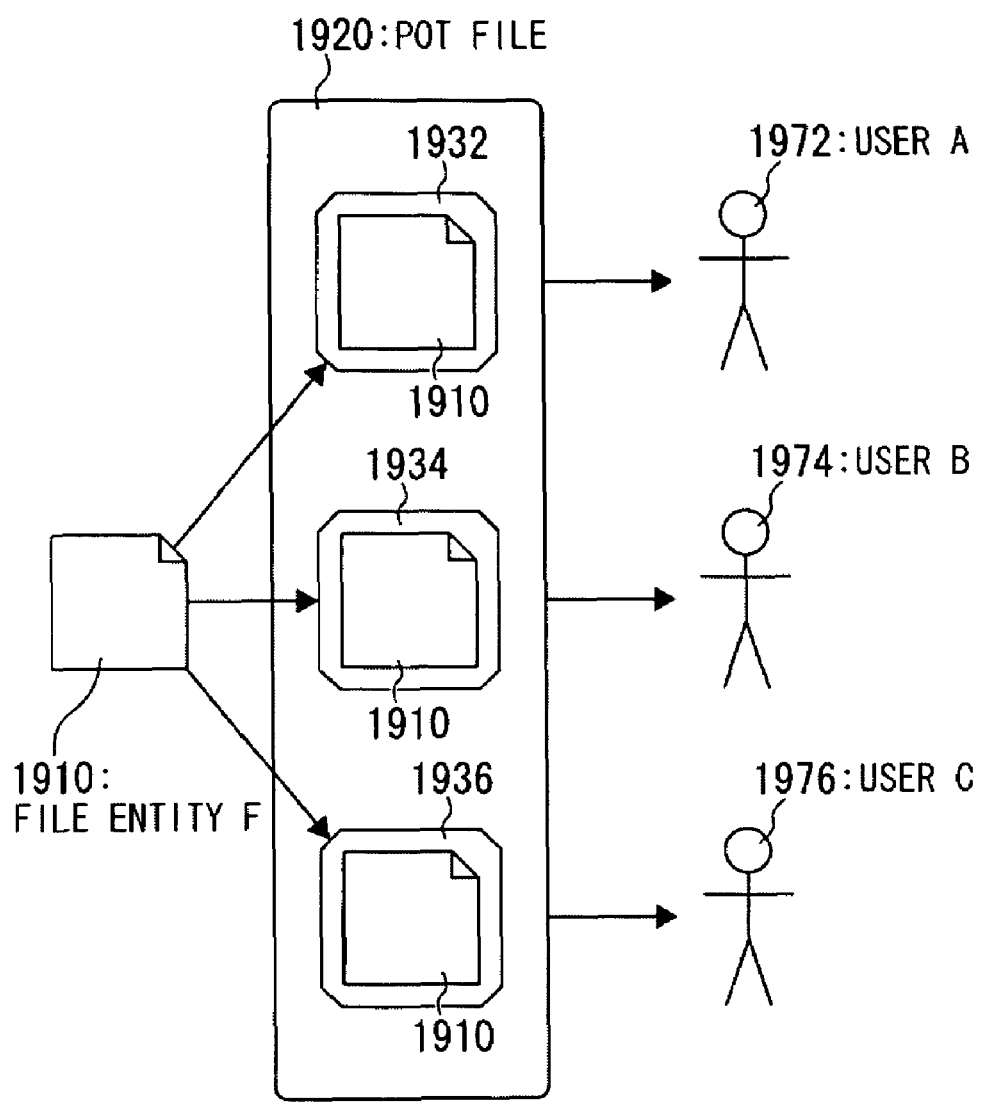
FIG. 31 is a diagram showing an example of access control by a simple public key method.
Figure 32:
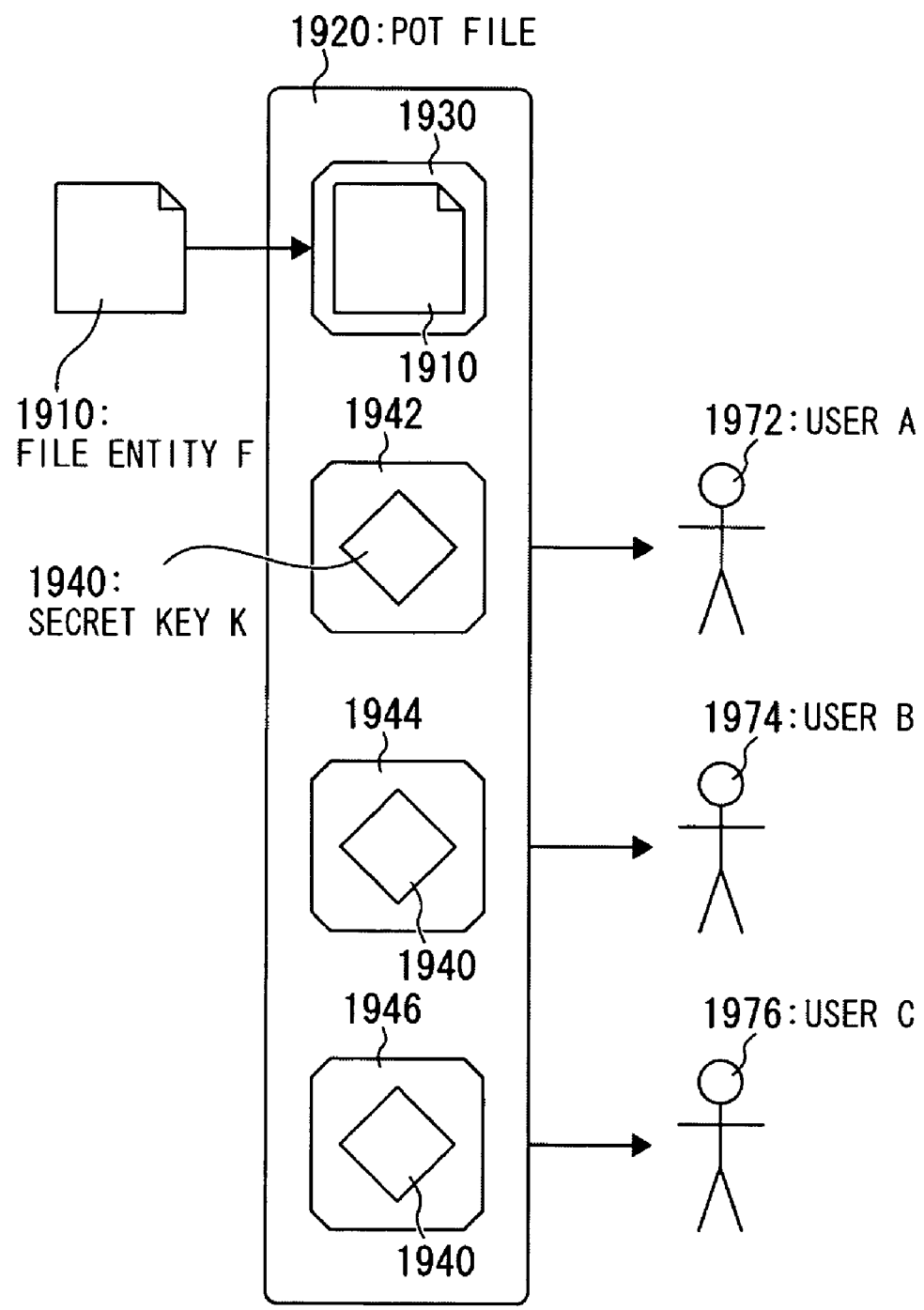
FIG. 32 is a diagram showing an example of access control by a secret key method.
Figure 33:
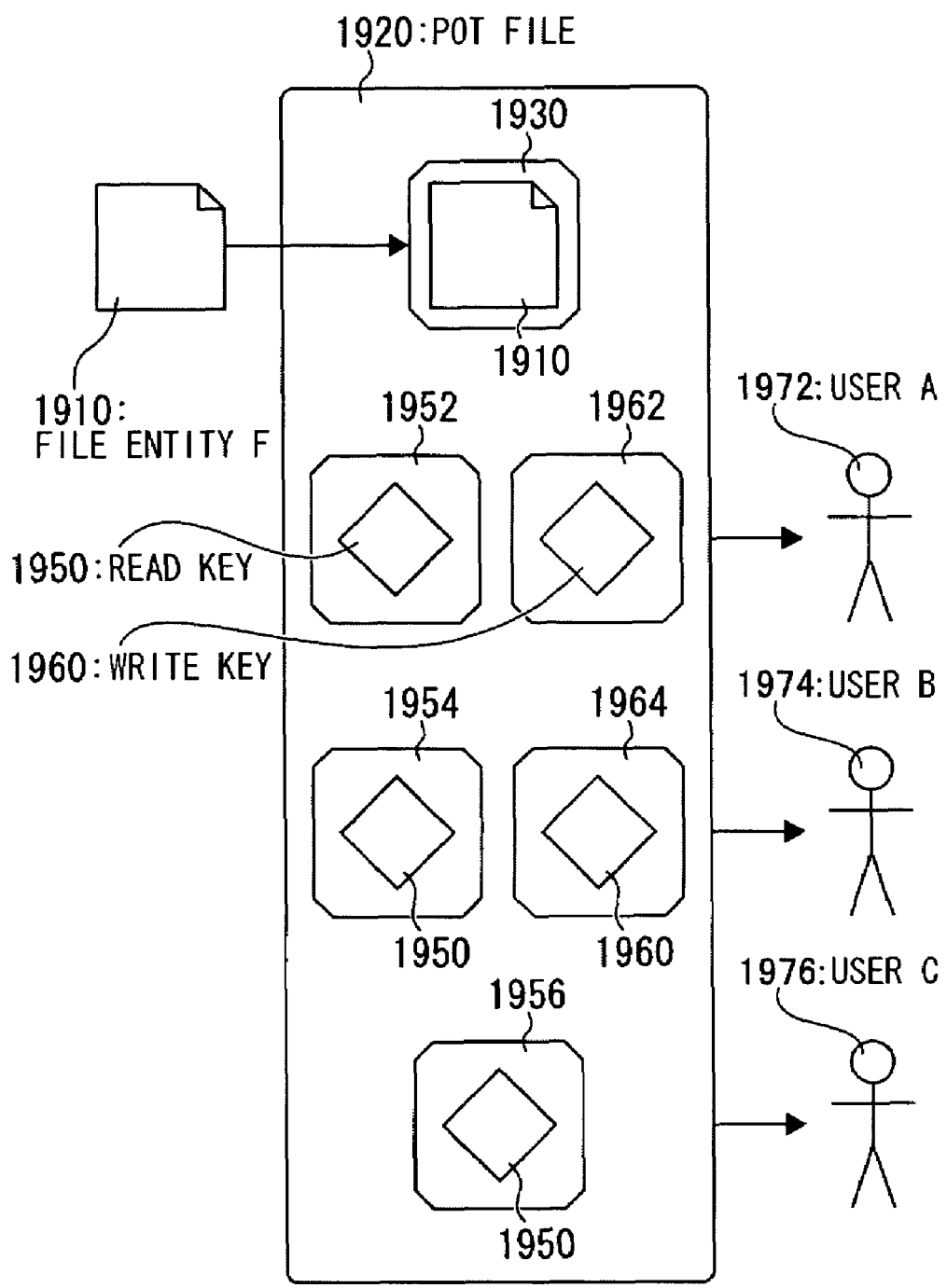
FIG. 33 is a diagram showing an example of access control by a read/write key method.

The access control using the encryption technique is described forthwith while referencing FIGS. 31 through 33. Note that the present invention assumes the following two points for implementing access control.
(a) Public key infrastructure (PKI) is available. In other words, correct public keys for the specified users can be obtained, and each user holds the secrecy of a secret key corresponding to an individual public key.
(b) An existing public key algorithm such as RSA algorithm is used as an encryption algorithm unless otherwise noted.

The present invention uses the following three methods 1 through 3 to implement access control.

Method 1: Access control using simple public key method

Method 2: Access control using secret key method

Method 3: Access control based on read/write key method using public key technique These three methods are described forthwith in order.

(Method 1: Access Control Using Simple Public Key Method)

Method 1 is available when specifying only read-in authority. FIG. 31 shows an example of access control using a simple public key method of method 1.

In FIG. 31, a creator of a pot-file 1920 gives to a user A (1972), a user B (1974), and a user C (1976) read-out authority of a file entity F (1910) to be subjected to access control.

In this case, the file entities F (1910) are encrypted using the public keys of the users A, B, and C, and stored in the pot-file 1920 (in the case of a static file) or a server on the network (in the case of a dynamic file). FIG. 31 shows a case of those encrypted files being stored in the pot-file 1920. In this case, the file entity F (1932) encrypted using the user A's public key, the file entity F (1934) encrypted using the user B's public key, and the file entity F (1936) encrypted using the user C's public key are stored in the pot-file 1920.

The file entity F is then decrypted using each user's secret key when each user uses the pot-file 1920. For example, the file entity F (1932) encrypted using the user A's public key is decrypted by the user A's secret key. This decryption allows read out of the file entity F (1910) for each user. On the other hand, since users who do not have read-out authority cannot carry out decryption, the contents of the file entity F (1910) cannot be read out.

(Method 2: Access Control Using Secret Key Method)

Since according to the above described method 1, the file entities must be encrypted for the number of users to whom read-out authority is given, a large storage area may be needed. Method 2 is an improved method 1, and allows conservation of storage region by decreasing the number of encrypted file entities.

Method 2 is available when specifying only read-in authority as with method 1. FIG. 32 shows an example of access control using the secret key method of method 2.

In FIG. 32, as with method 1, a creator of the pot-file 1920 gives to a user A (1972), a user B (1974), and a user C (1976) read-out authority of a file entity F (1910) to be subjected to access control.

In this case, to begin with, a secret key K (1940) for a secret key encryption algorithm (e.g., DES algorithm) is generated, and the file entity F (1910) is then encrypted using that secret key K and secret key encryption algorithm. The secret key K is then encrypted using the public keys of the users A, B, and C. Those encrypted files are stored in the pot-file 1920 (in the case of a static file) or a server on the network (in the case of a dynamic file). FIG. 32 shows a case of those encrypted files being stored in the pot-file 1920. In this case, the file entity F (1930) encrypted using the secret key K and secret key encryption algorithm, the secret key K (1942) encrypted using the user A's public key, the secret key K (1944) encrypted using the user B's public key, and the secret key K (1946) encrypted using the user C's public key are stored in the pot-file 1920.

When each user uses the pot-file 1920, to begin with, the secret key K is decrypted using each user's secret key. For example, the secret key K (1942) encrypted using the user A's public key is decrypted by user A's secret key. The file entity F (1930) encrypted using the secret key K is decrypted using the secret key K and secret key encryption algorithm. This decryption allows read out of the file entity F (1910) for each user. On the other hand, since users who do not have read-out authority cannot carry out decryption of the secret key K, the contents of the file entity F (1910) cannot be read out.

(Method 3: Access Control Based on Read/Write Key Method Using Public Key Technique)

Method 3 is available when specifying only read-out authority and when specifying both read-out authority and write-in authority of a single file. FIG. 33 shows an example of access control using a read/write key method of method 3.

In FIG. 33, a creator of the pot-file 1920 gives to a user A (1972) and a user B (1974), and only read-out authority is given to a user C (1976) read-out authority and write-in authority of a file entity F (1910) to be subjected to access control.

In this case, to begin with, a pair of a public key and a secret key for a public key algorithm is generated for the file entity F (1910); one is the a read key (1950), and the other is a write key (1960). The file entity F (1910) is then encrypted using the write key. The write key is then encrypted using the public keys of the users (A and B) who have write-in authority. On the other hand, the read key is then encrypted using the public keys of the users (A, B, and C) who have read-out authority. Those encrypted files are stored in the pot-file 1920 (in the case of a static file) or a server on the network (in the case of a dynamic file). FIG. 33 shows a case of those encrypted files being stored in the pot-file 1920. In this case, the file entity F (1930) encrypted using the write key, the read key (1952) and the write key (1962) encrypted using the user A's public key, the read key (1954) and the write key (1964) encrypted using the user B's public key, and the read key (1956) encrypted using the user C's public key are stored in the pot-file 1920.

To begin with, the read keys are decrypted using the secret keys when each of users (A, B, and C) who has read-out authority uses the pot-file 1920. For example, the read key (1952) encrypted using the user A's public key is decrypted by user A's secret key. The file entity F (1930) encrypted using the write key is decrypted using the read key. This decryption allows read out of the file entity F (1910) for each user who has read-out authority.

On the other hand, the write key is decrypted using each user's secret key when each user (A, B) who has write-in authority writes in the file entity F. The file entity F after being written in is then encrypted using the write key.

On the other hand, since users who do not have read-out authority cannot carry out decryption of the read key, the contents of the file entity F (1910) cannot be read out. In addition, since users who do not have write-in authority cannot carry out decryption of the write key, the fact that they do not have write-in authority is detected by the SoftwarePot system. Since the file entity F cannot be correctly encrypted even if attempting to write-in by falsely manipulating the SoftwarePot system, unauthorized write-in operation is detected by the users who have read-out authority.

(Effectiveness of File Access Control Function)

Usage of the above described access control function allows implementation transparent to application (i.e., unbeknown to application), of giving file access authorities (read-out authority and write-in authority) to a specific user.

In addition, since the above described access control function uses the encryption technique, even if a user who does not have access authority falsely changes the SoftwarePot system, other SoftwarePot systems that are not changed can carry out correct access control (i.e., only users who have read-out/write-in authority can carry out a read-out/write-in operation).

According to the above described method 3, if a file which is falsely written is to be circulated, the correct SoftwarePot system can detect that false write-in. In other words, when a file, which is falsely written (changed) by a user who does not have access authority, is to be circulated, that false write-in (change) is detected when the users who have read-out authority read that file.

In addition, a pot-file creator can configure a user group ad hoc, and carry out a groupware process by providing access control within that user group. At this time, the groupware process can be carried out without modifying the existing single user application.

INDUSTRIAL AVAILABILITY

According to the above described configuration, a secure software execution mechanism appropriate for software circulation can be provided.

What is claimed is:

1. A secure software execution system in which secure software is executed in a transmitted execution system comprising:
   a pot that includes a file storage unit which stores files, and a file name storage unit, which stores names of files including a file name of a file which is other than those in the file storage unit and which is related to a dynamic file, and wherein the file name of a file which is other than those in the file storage unit and which is related to the dynamic file indicates a file name of a file in an execution system or in another pot; and
   a mapping means that translates the file name of a file which is other than those in the file name storage unit and which is related to the dynamic file into a file name of the execution system,
   wherein the mapping means carries out mapping in conformity with a mapping and security policy specification which relates to file accessibility for the pot when executing the executable file,
   the mapping means extracts the file from the file storage unit so that the extracted file is provided to the execution system, before execution or/and when required during execution, and
   the mapping means maps the file name of a file which is other than those in the file storage unit and which is related to the dynamic file, to the file in the execution system or in the another pot, by referring to the file name storage unit.

2. The secure software execution system of claim 1, wherein an executable file name to be initiated first can be stored in the file name storage unit.

3. The secure software execution system of claim 1, wherein the file name storage unit can store directory names, and the mapping means maps each of those directory names to a directory for an execution system and/or a directory in another pot.

4. The secure software execution system of claim 3, wherein the mapping means associates the directory names with a plurality of directories in a predetermined order, and maps them to files in the directories in that order.

5. The secure software execution system of claim 1, wherein the file name storage unit can store file names in a site on a network, and the mapping means transfers a file having the file name from a site to an execution system.

6. The secure software execution system of claim 1, wherein the mapping means can map a process as a file.

7. The secure software execution system of claim 1, wherein the mapping means can map to a file created by a process.

8. The secure software execution system of claim 1, wherein the security policy specification includes specification of system calls that can be issued during execution.

9. The secure software execution system of claim 1, wherein the security policy specification can be downloaded from another site on the network.

10. The secure software execution system according to claim 1, wherein the file name storage unit stores the names of files with a directory name.

11. The secure software execution system of claim 10, wherein the mapping means decrypts and reads out a file by each user's read-out key.

12. The secure software execution system of claim 10, wherein the mapping means decrypts a read-out key by each user's secret key, and decrypts and reads out a file using that decrypted key.

13. The secure software execution system of claim 10, wherein the mapping means decrypts a pair of a public key and a secret key or a read-out key and a write-in key by each user's secret key, and decrypts or encrypts a file using that decrypted key.

14. The secure software execution system according to claim 1, wherein a file name storage unit, which stores the names of files with a directory name.

15. A recording medium that records a program describing implementation of a mapping means in a computer system, which translates a file name in a file name storage unit in a pot into a file name for an execution system,
   wherein the pot includes a file storage unit which stores files, and a file name storage unit, which stores names of files including a file name of a file which is other than those in the file storage unit and which is related to a dynamic file, wherein the file name of a file which is other than those in the file storage unit and which is related to the dynamic file indicates a file name of a file in another pot;

wherein the mapping means carries out mapping in conformity with a mapping and security policy specification which relates to file accessibility for the pot when executing the executable file, the mapping means extracts the file from the file storage unit so that the extracted file is provided to the execution system, before execution or/and when required during execution, and the mapping means maps the file name of a file which is other than those in the file storage unit and which is related to the dynamic file, to the file in the execution system or in the another pot, by referring to the file name storage unit.

* * * * *